(12) United States Patent
Sendur et al.

(10) Patent No.: US 8,345,374 B2
(45) Date of Patent: Jan. 1, 2013

(54) PATTERNED MEDIA FOR HEAT ASSISTED MAGNETIC RECORDING

(75) Inventors: Ibrahim Kursat Sendur, Pittsburgh, PA (US); William Albert Challener, Sewickley, PA (US); Chubing Peng, Pittsburgh, PA (US)

(73) Assignee: Seagate Technology, LLC, Cupertino, CA (US)

( * ) Notice: Subject to any disclaimer, the term of this patent is extended or adjusted under 35 U.S.C. 154(b) by 855 days.

(21) Appl. No.: 10/447,602

(22) Filed: May 29, 2003

(65) Prior Publication Data

US 2004/0240327 A1 Dec. 2, 2004

(51) Int. Cl.
*G11B 5/58* (2006.01)
(52) U.S. Cl. .................................... 360/77.01
(58) Field of Classification Search ............ 369/13.35; 720/718
See application file for complete search history.

(56) References Cited

U.S. PATENT DOCUMENTS

| | | | |
|---|---|---|---|
| 3,869,711 A * | 3/1975 | Bernard et al. ............ 360/17 |
| 4,274,935 A | 6/1981 | Schmelzer et al. | |
| 4,616,237 A | 10/1986 | Pettigrew et al. | |
| 4,830,465 A | 5/1989 | Werner et al. | |
| 4,893,299 A | 1/1990 | Humberstone et al. | |
| 4,935,278 A | 6/1990 | Krounbi et al. | |
| 5,258,973 A | 11/1993 | Lida | |
| 5,368,986 A | 11/1994 | Terao et al. | |
| 5,399,372 A | 3/1995 | Grimes et al. | |
| 5,463,609 A | 10/1995 | Inagaki et al. | |
| 5,576,114 A | 11/1996 | Kurisu et al. | |
| 5,582,896 A | 12/1996 | Kuwamoto et al. | |
| 5,587,223 A | 12/1996 | White | |
| 5,614,279 A | 3/1997 | Kuwamoto et al. | |
| 5,626,941 A * | 5/1997 | Ouano ....................... 428/141 |
| 5,703,733 A * | 12/1997 | Suzuki et al. ............ 360/77.01 |
| 5,820,769 A | 10/1998 | Chou | |
| 5,956,216 A | 9/1999 | Chou | |
| 6,055,215 A | 4/2000 | Katsuragawa | |
| 6,094,413 A | 7/2000 | Guerra | |
| 6,162,532 A | 12/2000 | Black et al. | |
| 6,194,048 B1 | 2/2001 | Hatakeyama et al. | |
| 6,304,522 B1 | 10/2001 | Valet et al. | |
| 6,347,016 B1 * | 2/2002 | Ishida et al. .................. 360/17 |
| 6,367,924 B1 | 4/2002 | Sato et al. | |
| 6,493,164 B1 | 12/2002 | Kikitsu et al. | |
| 6,623,875 B2 | 9/2003 | Inomata et al. | |
| 6,804,175 B2 * | 10/2004 | Ruigrok et al. ............ 369/13.55 |

(Continued)

FOREIGN PATENT DOCUMENTS

EP 1148370 A2 10/2001

(Continued)

OTHER PUBLICATIONS

*Patent Abstracts of Japan*, vol. 16, No. 253 (M-1263), Jun. 9, 1992 & JP 04062090 (Ube Ind Ltd), Feb. 27, 1992.

(Continued)

*Primary Examiner* — David D Davis
(74) *Attorney, Agent, or Firm* — Ladas & Parry, LLP

(57) ABSTRACT

A patterned magnetic recording medium for use in heat assisted magnetic recording comprises an electrically conductive heat sink layer and a plurality of discrete magnetic recording elements positioned adjacent to a first surface of the heat sink layer. Disc drives that include the patterned medium and a method of magnetic recording using the patterned media are also included.

15 Claims, 18 Drawing Sheets

U.S. PATENT DOCUMENTS

| | | |
|---|---|---|
| 6,970,379 B2 | 11/2005 | Parkin et al. |
| 6,977,108 B2 | 12/2005 | Heida et al. |
| 7,220,482 B2 | 5/2007 | Mino et al. |
| 2001/0006436 A1 | 7/2001 | Akiyama et al. |
| 2001/0006744 A1 | 7/2001 | Saito |
| 2001/0016271 A1 | 8/2001 | Aoyama |
| 2001/0017820 A1 | 8/2001 | Akiyama et al. |
| 2002/0022111 A1 | 2/2002 | Black et al. |
| 2002/0022198 A1 | 2/2002 | Bar-Gadda |
| 2002/0034666 A1 | 3/2002 | Kiely |
| 2002/0086185 A1 | 7/2002 | Yasui et al. |
| 2002/0132083 A1 | 9/2002 | Weller et al. |
| 2002/0136927 A1 | 9/2002 | Hieda et al. |
| 2002/0142163 A1 | 10/2002 | Mino et al. |
| 2002/0168548 A1 | 11/2002 | Sakurai et al. |
| 2003/0072971 A1 | 4/2003 | Fukutani et al. |
| 2003/0128452 A1 | 7/2003 | McDaniel et al. |
| 2003/0180577 A1 | 9/2003 | Do et al. |
| 2005/0041950 A1 | 2/2005 | Rottmayer et al. |
| 2005/0078511 A1 | 4/2005 | Parkin et al. |
| 2005/0157597 A1 | 7/2005 | Sendur et al. |

FOREIGN PATENT DOCUMENTS

| | | |
|---|---|---|
| WO | WO 99/53494 | 10/1999 |
| WO | WO 00/14732 | 3/2000 |
| WO | WO 01/73763 A1 | 10/2001 |

OTHER PUBLICATIONS

R. Dittrich et al., "Finite element Simulation of Discrete Media with Granular Structure", IEEE Transactions on Magnetics, vol. 38, No. 5 Sep. 2002, pp. 1967-1969.

C. Rettner et al., "Magnetic Characterization & Recording Properties of Patterned Co70Crl8Pt12 Perpendicular Media", IEEE Transactions on Magnetics, vol. 38, No. 4, Jul. 2002, pp. 1725-1730.

C. Rettner et al., "Patterning of Granular Magnetic Media with a Focused Ion Beam to Produce Single-Domain Islands at>140 Gvit/in2", IEEE Transactions on Magnetics, vol. 37, No. 4, Jul. 2001, pp. 1649-1651.

J. Lohau et al., "Effect of Ion Beam Patterning on the Write & Read Performance of Perpendicular Granular Recording Media", IEEE Transactions on Magnetics, vol. 37, No. 4, Jul. 2001, pp. 1652-1656.

T. Shimatsue et al., "Formation of Magnetic Cluster & Remanence Ceorcivity in Granular-Type Perpendicular Media", IEEE Transactions on Magnetics, vol. 39, No. 5, Sep. 2003, pp. 2335-2337.

A. Goodman et al., "Effect of Intergranular Exchange Coupling on Transition Irregularity in Coupled Granular/Continuous Perpendicular Media", IEEE Transactions on Magnetics, vol. 39, No. 2, Mar. 2003, pp. 685-690.

Office Actions dated: Jan. 8, 2008, Jul. 16, 2008, Oct. 3, 2008, Jan. 12, 2009 for U.S. Appl. No. 11/050,919.

* cited by examiner ion
PATTERNED MEDIA FOR HEAT ASSISTED MAGNETIC RECORDING

STATEMENT REGARDING FEDERALLY SPONSORED RESEARCH OR DEVELOPMENT

This invention was made with the United States Government support under Agreement No. 70NANB1H3056 awarded by the National Institute of Standards and Technology (NIST). The United States Government has certain rights in the invention.

FIELD OF THE INVENTION

This invention relates to magnetic storage media, and more particularly to patterned magnetic storage media for heat assisted magnetic recording, and to disc drives that can include such magnetic recording media.

BACKGROUND OF THE INVENTION

In magnetic recording, superparamagnetic instabilities become an issue as the grain volume of the recording media is reduced in order to control media noise for high areal density recording. The superparamagnetic effect is most evident when the grain volume V is sufficiently small that the inequality $K_u V/k_B T > 70$ can no longer be maintained, where $K_u$ is the material's magnetic crystalline anisotropy energy density, $k_B$ is Boltzmann's constant, and T is absolute temperature. When this inequality is not satisfied, thermal energy demagnetizes the stored bits. Therefore, as the grain size is decreased in order to increase the areal density, a threshold is reached for a given material $K_u$ and temperature T such that stable data storage is no longer feasible.

Conventional magnetic recording techniques will likely reach physical limits to storage density which are due to the super-paramagnetic effect. One possible solution to overcome this limit is heat assisted magnetic recording (HAMR). Heat assisted magnetic recording generally refers to the concept of locally heating a recording medium to reduce the coercivity of the recording medium so that the applied magnetic writing field can more easily direct the magnetization of the recording medium during the temporary magnetic softening of the recording medium caused by the heat source. Heat assisted magnetic recording allows for the use of small grain media, which is desirable for recording at increased areal densities, with a larger magnetic anisotropy at room temperature to assure sufficient thermal stability. Heat assisted magnetic recording can be applied to any type of magnetic storage media, including tilted media, longitudinal media, perpendicular media and patterned media.

Extremely small thermal spots with high temperatures are required in a HAMR system to reduce the coercivity of the medium. To achieve such thermal spots, a focused optical beam from a laser with extremely high transmission efficiency is needed. Several optical transducers have been proposed to achieve high transmission efficiencies in small spots, however, numerical simulations suggest that the transmission efficiency of these optical transducers may not be large enough to achieve high temperatures in extremely small spots.

There is a need for recording media that can be used in heat assisted magnetic recording systems and provides an increased storage density.

SUMMARY OF THE INVENTION

This invention provides a patterned magnetic recording medium for use in heat assisted magnetic recording comprising an electrically conductive heat sink layer and a plurality of discrete magnetic recording elements positioned adjacent to a first surface of the heat sink layer.

A substrate layer can be positioned adjacent to a second surface of the first heat sink layer. The heat sink can be formed of one or more layers that can have an anisotropic or isotropic thermal conductivity. The discrete magnetic recording elements can comprise deposited structures, self-ordered structures, or complementary shaped structures.

In another aspect, the invention encompasses disc drives comprising means for rotating a recording medium and means for positioning a recording head adjacent to a surface of the storage medium, wherein the recording medium comprises an electrically conductive heat sink layer, and a plurality of discrete magnetic recording elements positioned adjacent to a first surface of the heat sink layer.

The disc drive can include means for producing electromagnetic radiation having an electric field component substantially perpendicular to a surface of the heat sink, and means for changing the magnetization of the discrete magnetic recording elements.

In another aspect the invention encompasses a method of magnetic recording comprising: positioning a recording head adjacent to a patterned magnetic recording medium including an electrically conductive heat sink layer and a plurality of discrete magnetic recording elements positioned adjacent to a first surface of the heat sink layer; producing electromagnetic radiation having a component substantially perpendicular to a surface of the heat sink to raise the temperature of the discrete magnetic recording elements; and changing the magnetization of the discrete magnetic recording elements.

BRIEF DESCRIPTION OF THE DRAWINGS

FIG. 4b is an oblique view of a portion of the patterned recording medium of FIG. 4a.

FIG. 5b is an oblique view of a portion of the patterned recording medium of FIG. 5a.

FIGS. 6b and 6c are oblique views of a portion of the patterned recording medium similar to that of FIG. 6a.

FIG. 15b is a graph of temperature versus distance for the patterned media of FIG. 15a.

FIG. 15c is a graph of temperature versus time for the patterned media of FIG. 15a.

FIG. 16b is a graph of temperature versus distance for the patterned media of FIG. 16a.

FIG. 16c is a graph of temperature versus time for the patterned media of FIG. 16a.

FIG. 17b is a graph of temperature versus distance for the patterned media of FIG. 17a.

FIG. 17c is a graph of temperature versus time for the patterned media of FIG. 17a.

FIG. 18b is a graph of temperature versus distance for the patterned media of FIG. 18a.

FIG. 18c is a graph of temperature versus time for the patterned media of FIG. 18a.

DETAILED DESCRIPTION OF THE INVENTION

Figure 1:
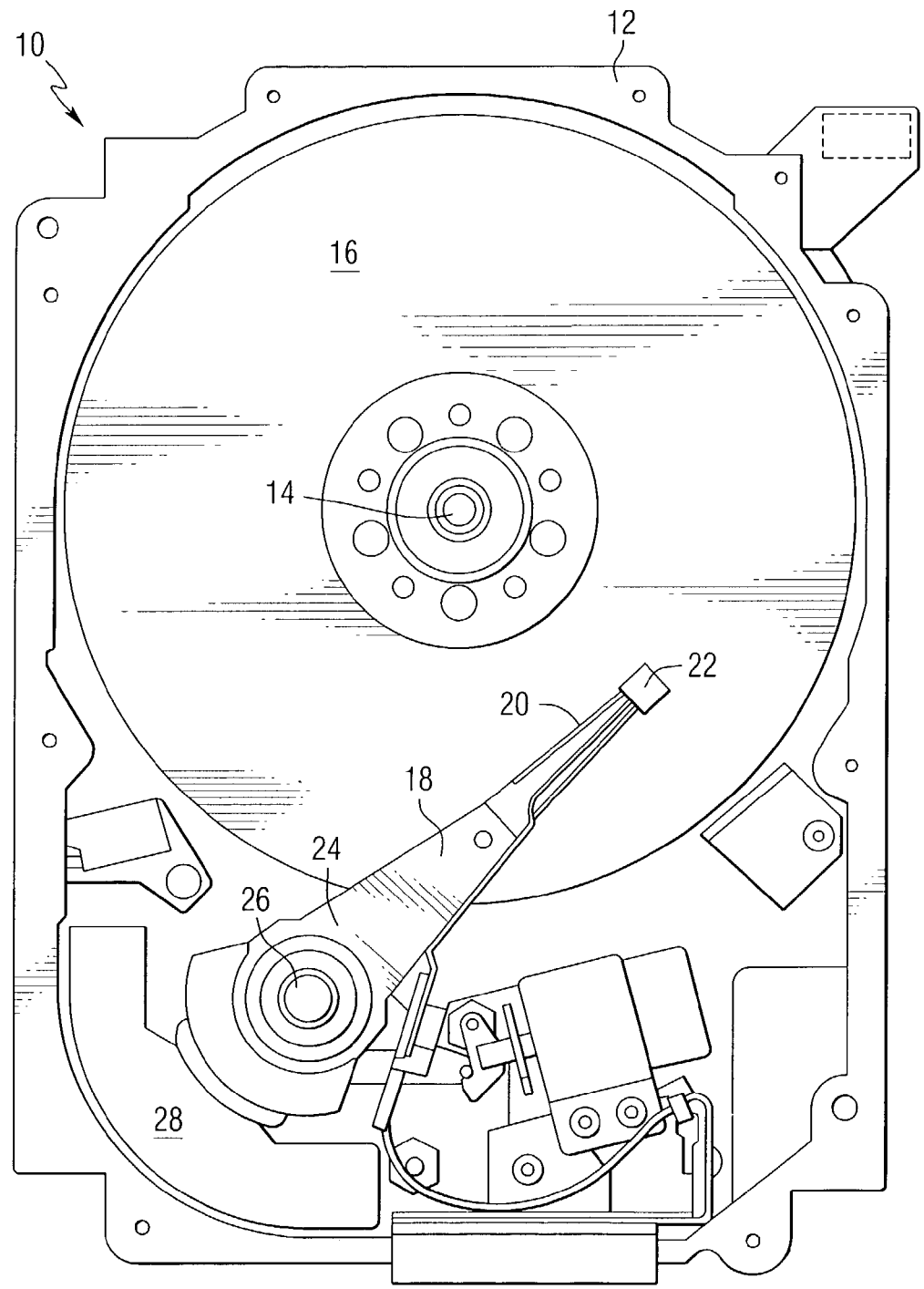
FIG. 1 is a pictorial representation of a magnetic disc drive that can include magnetic recording media constructed in accordance with this invention.

FIG. 1 is a pictorial representation of a disc drive 10 that can utilize patterned media constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing. The storage medium can be a patterned magnetic disc constructed in accordance with this invention. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well known in the art.

For heat assisted magnetic recording, electromagnetic radiation (typically light) is used to heat a portion of the magnetic storage medium. This facilitates the subsequent recording of magnetic information in the heated portion of the medium. Heat assisted magnetic recording heads include means for directing electromagnetic radiation onto the surface of the storage medium, and an associated means for producing a magnetic signal for affecting the magnetization of the storage medium.

This invention provides a recording media that increases the transmission efficiencies of the optical transducer required in a HAMR system. The medium uses isolated patterned volumes of magnetic material to increase the light coupling and temperature response. Furthermore, the medium utilizes an electrically conductive heat-sink underlayer which reduces the coupling inefficiency due to fringing of the electric field lines and removes the heat quickly from the magnetic storage elements.

A metal pin can be used as a transducer to concentrate optical energy into arbitrarily small areal dimensions. The metal pin can support a surface plasmon mode which propagates along the pin, and the width of the external electric field generated by the surface plasmon mode is proportional to the diameter of the pin. Smaller pin diameters result in smaller spots, and in principle the spot size can be made arbitrarily small. Although a metallic pin can be used as a near field transducer, the media of this invention will improve the transmission efficiency of other near field transducers as well. As an example, a "ridge waveguide" transducer could be used.

Figure 2A:
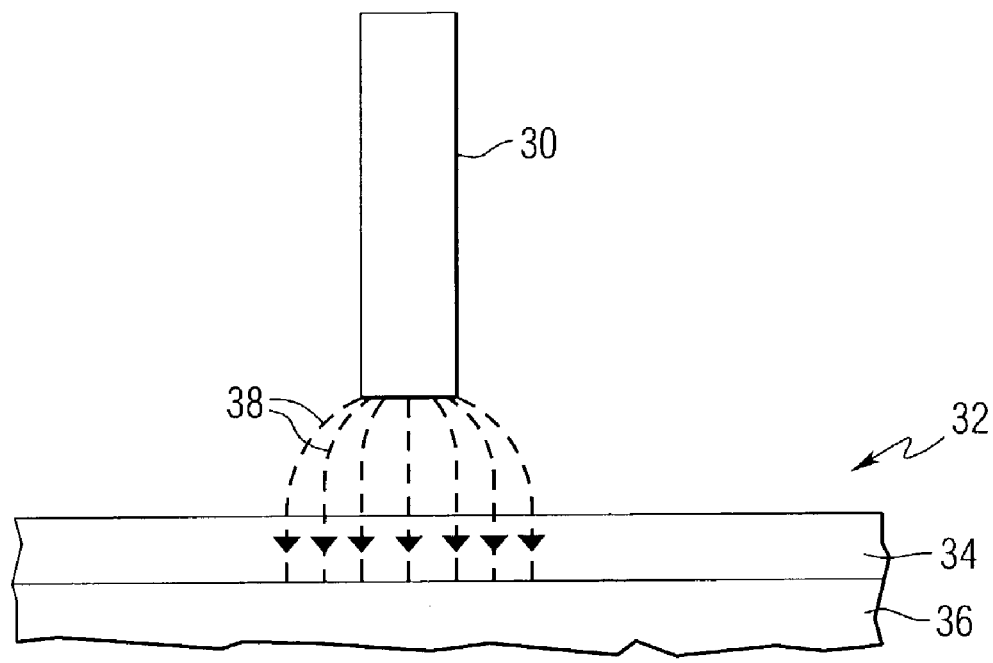
FIGS. 2a and 2b are schematic representations of a metallic pin adjacent to a recording medium.

FIG. 2a is a schematic representation of a pin 30 adjacent to a conventional recording medium 32, including a magnetic layer 34 and a substrate 36. The pin can be made of a metal such as gold. Electric field lines 38 are shown to be substantially normal to the surface of the magnetic layer.

Figure 2B:
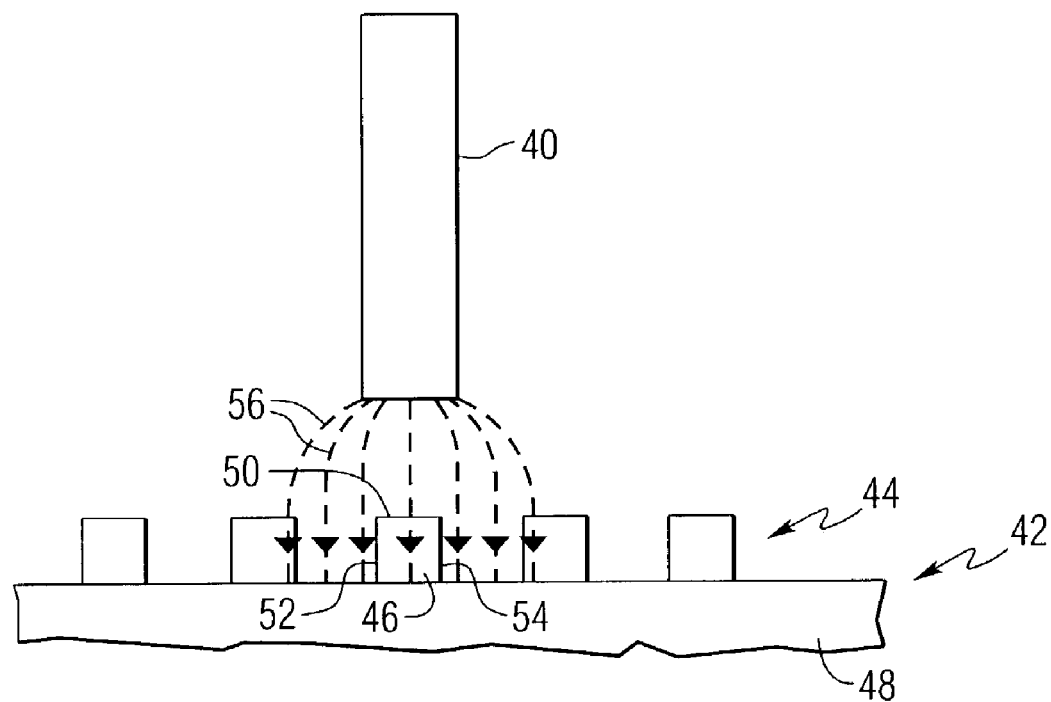

FIG. 2b is a schematic representation of a pin 40 adjacent to a patterned recording medium 42, including a magnetic recording layer 44 having a plurality of isolated magnetic recording elements 46 and a heat sink 48. Each of the magnetic recording elements includes a top surface 50 and side surfaces 52 and 54. Electric field lines 56 are shown to be substantially normal to the surface of the heat sink. The isolated magnetic recording elements are separated by an electrically insulating material, that in this example is air. However, it should be understood that other electrically insulating materials can be positioned between the recording elements, and/or an electrically insulating lubricant can be applied to the surface of the media, with the lubricant filling the spaces between the isolated magnetic recording elements.

In the case of traditional media, the electric field lines are normal to the magnetic layer of the medium as shown in FIG. 2a. However, in the case of patterned media the electric field lines are both normal (at the top surfaces) and tangential (on the side surfaces) to the isolated magnetic recording elements of the medium as shown in FIG. 2b. The normal component of the electric field intensity across an interface is discontinuous. The tangential components of the electric field across an interface between two media (with no impressed magnetic current densities along the boundary of the interface) is continuous. With the recording medium of FIG. 2b, the electric field is continuous along the sides of the magnetic recording elements. That is, the sides of the magnetic recording elements form a boundary of the elements to air interface. Due to this continuity, the tangential components of the field will couple better to the medium. Therefore, much higher absorbed optical power is expected in the case of patterned media.

Figure 3A:
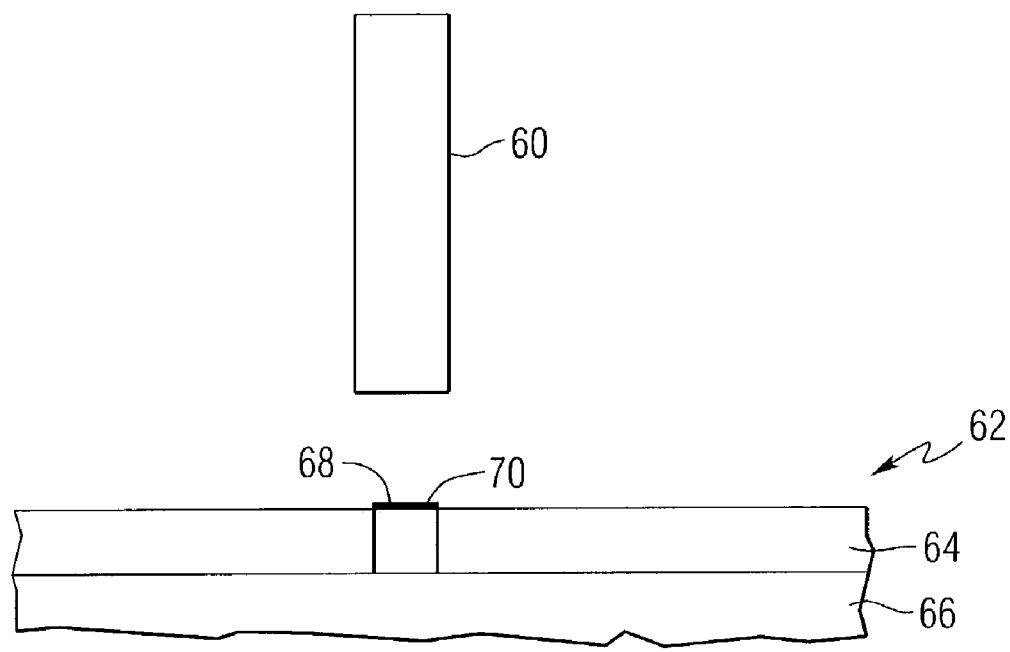
FIGS. 3a and 3b are schematic representations of a metallic pin adjacent to a recording medium.

Thus the effective coupling surface per unit volume is increased in the patterned media case. This fact is further illustrated in FIGS. 3a and 3b. FIG. 3a is a schematic representation of a metallic pin 60 adjacent to a conventional recording medium 62 that includes a magnetic layer 64 on a substrate 66. For the traditional media, the electric fields couple to the medium through interactions at the top surface 68 as illustrated in FIG. 2a, as illustrated by line 70.

Figure 3B:
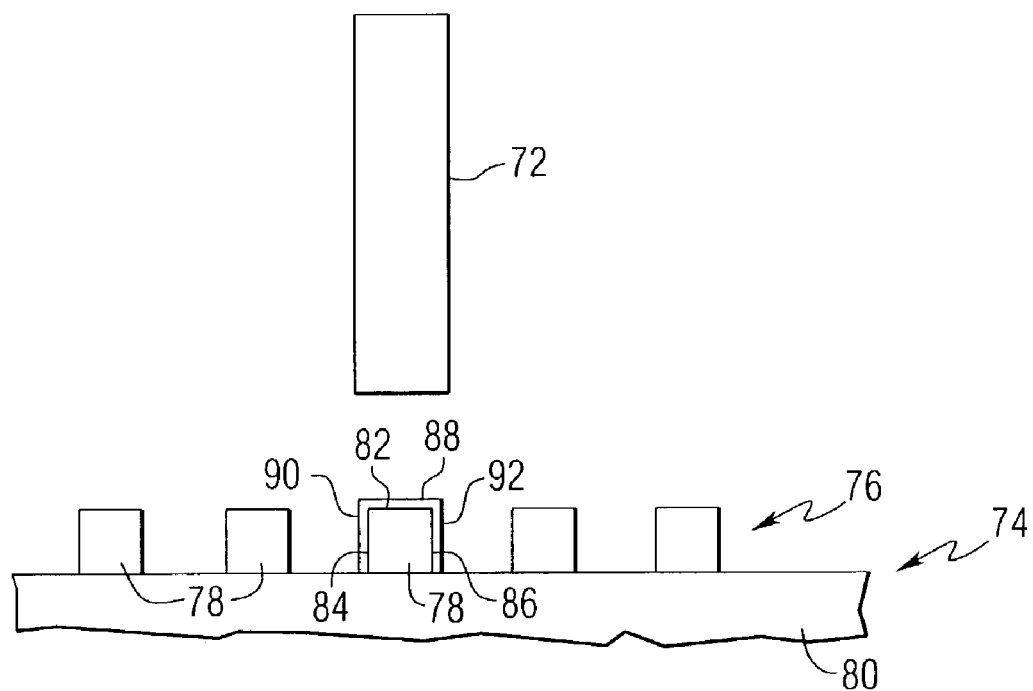

FIG. 3b is a schematic representation of a metallic pin 72 adjacent to a patterned recording medium 74, including a magnetic recording layer 76 having a plurality of isolated magnetic recording elements 78 and a heat sink 80. Each of the magnetic recording elements includes a top surface 82 and side surfaces 84 and 86. For the patterned media, the fields couple to the medium through the interactions along the side surfaces 84 and 86 as well as the top surface 82 as shown by lines 88, 90 and 92 in FIG. 3b. If the magnetic recording elements (bits) are in the shape of cubes, the effective coupling surface increase is 5 times. If the magnetic recording elements are 5 nm×5 nm×10 nm rectangular prisms, the effective coupling surface increase is 9 times. The field couples better on the side surfaces than at the top surface.

The spread of the absorbed power is reduced since the medium is digitized and the air between the isolated magnetic recording elements is a good electrical insulator. Therefore, smaller full width half maximum (FWHM) spot sizes can be expected for patterned media. The heat sink is a better electrical conductor than the recording layer. Therefore, it forces the electric field lines to be normal to the surface of the heat sink, which prevents the fringing of the electric field lines in the patterned medium case. The absorbed optical power per effective volume is increased because of the increase in the electric field intensities, better coupling, and reduced effective volume. Therefore, the source function in the heat transfer equation (the heat generation source per unit volume) is increased, which will result in higher temperatures.

The increased source function is not the only factor contributing to the heating improvements. The heat loss via thermal conduction is reduced by using discrete magnetic recording elements. In the various examples, air fills the gaps between the magnetic recording elements, and air is a good insulator. However, it should be recognized that other insulating materials can be used in the spaces between the magnetic recording elements. Any insulating material will prevent the heat loss via thermal conduction. Thus the use of discrete magnetic recording elements should further enhance the temperature increases. For the patterned medium, a less aggressive heat sink layer can be used than would be needed in media having a continuous magnetic layer, since the thermal spread is prevented and smaller thermal FWHMs are expected. A less aggressive heat sink layer means higher temperature increases.

FIGS. 2a and 2b illustrate that the electric field will couple better to the patterned media because, while the electric field lines are normal to the continuous magnetic layer in traditional media, the electric field lines are both normal (at the top surfaces) and tangential (on the side surfaces) to the isolated magnetic recording elements in the patterned media. Thus the latter will couple even better than the former. The aspect ratios in the figures are not drawn to scale.

Figure 4A:
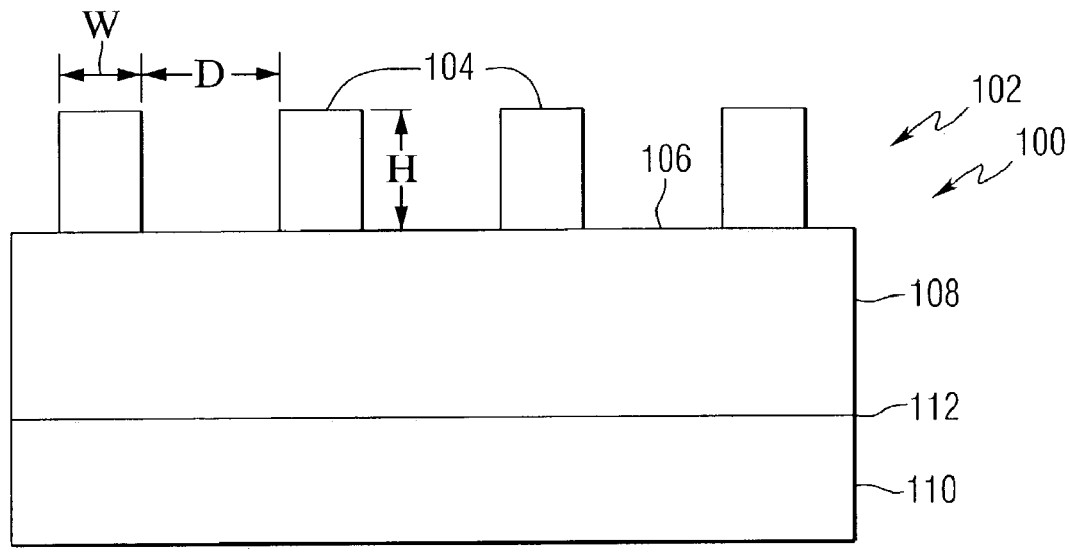
FIG. 4a is a side view of a portion of a patterned recording medium constructed in accordance with this invention.
Figure 4B:
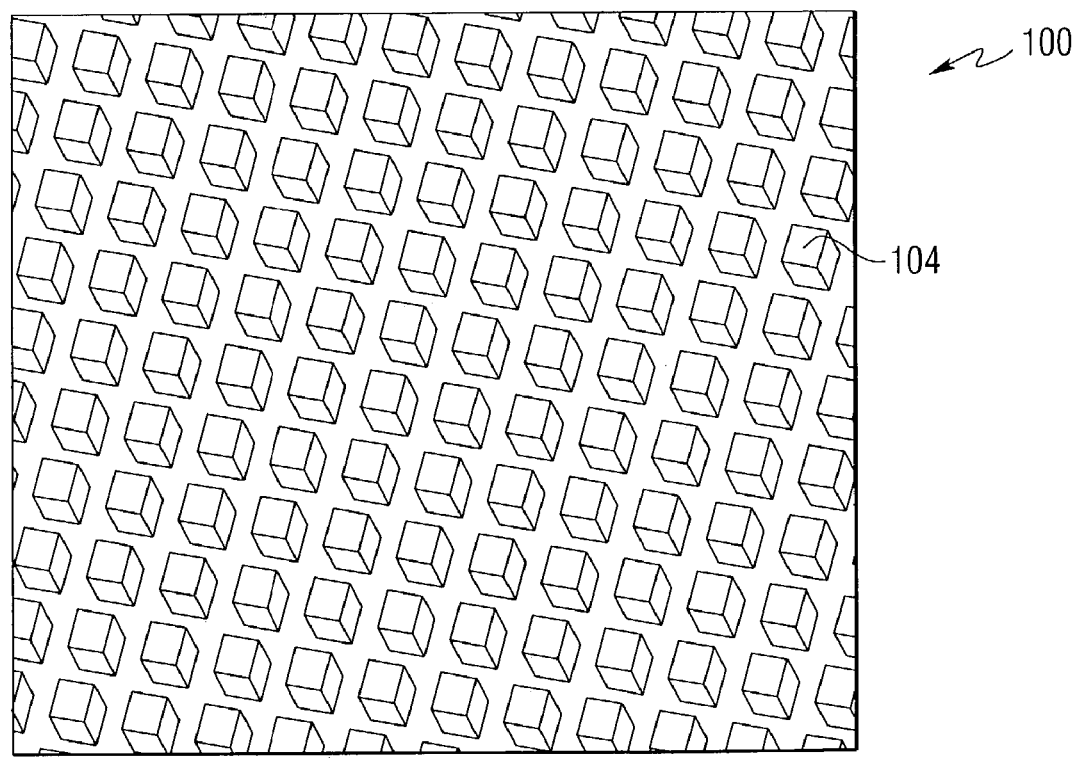

Several media configurations are possible, and different variations of these configurations are illustrated in the various figures. FIG. 4a is a side view of a portion of a patterned recording medium 100 constructed in accordance with this invention. FIG. 4b is an oblique view of a portion of the patterned recording medium of FIG. 4a. Patterned medium 100 includes a magnetic recording layer 102 having a plurality of isolated magnetic recording elements 104 positioned adjacent to a first surface 106 of an electrically conductive and thermally conductive heat sink layer 108. A substrate 110 is positioned adjacent to a second surface 112 of the heat sink.

FIGS. 4a and 4b illustrate a pin-shape structured medium with a uniform heat sink. Isolated media volumes are located on top of the heat-sink layer, and their width and height are identified as W and H, respectively. These isolated media volumes are separated by a distance of D from each other. Media sparsity, S, which is a measure of how closely the media volumes are located, can be defined as:

$$S = \frac{W}{W - D}$$

In the limit $S \to 1$, the medium becomes continuous. The other limit $S \to 0$ represents a medium composed of a single isolated volume. A heat sink layer with a thickness of L is located between the magnetic recording layer and the substrate.

An example medium can be constructed by selecting the isolated media volumes in the shape of rectangular prisms of sizes 5 nm×5 nm×10 nm separated by a distance of 5 nm from each other, which results in a sparsity S=0.5. The heat sink underlayer can be gold with a thickness of 200 nm. FIG. 4b illustrates an oblique view of the sample medium 100.

Figure 5A:
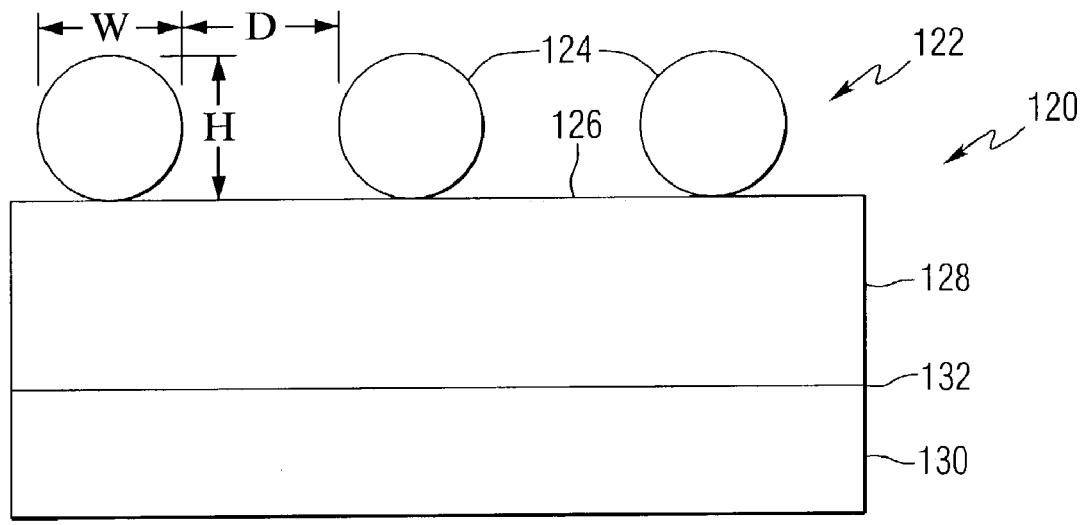
FIG. 5a is a side view of a portion of a self-ordered patterned recording medium constructed in accordance with this invention.
Figure 5B:
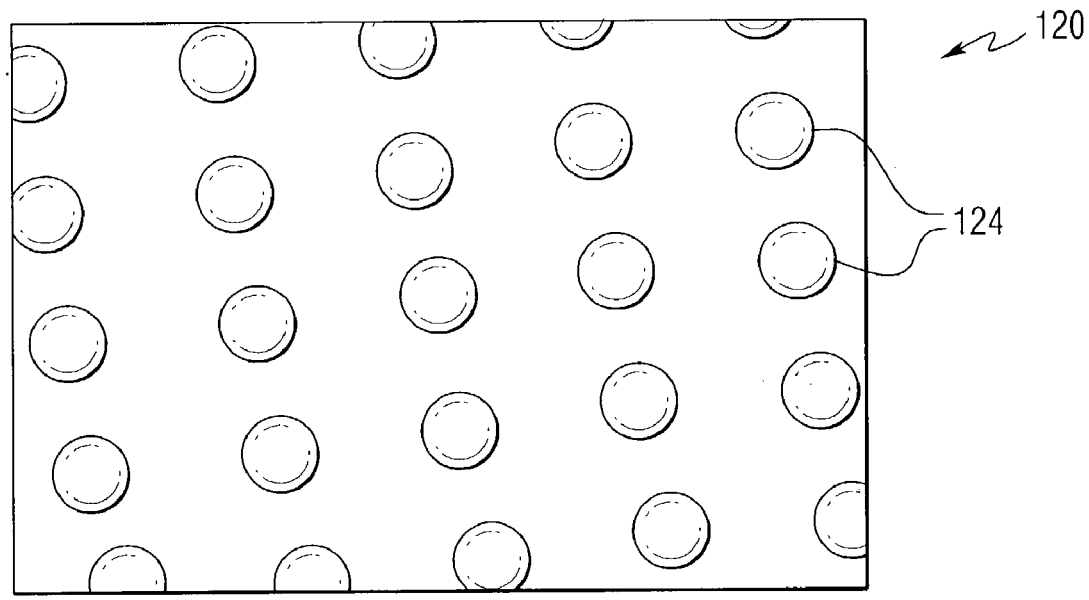

FIG. 5a is a side elevation view of a medium 120 including a magnetic recording layer 122 having a plurality of spherical particles 124 such as might be deposited onto a surface 126 of a uniform heat sink 128 by a self-ordering process. A substrate 130 is positioned adjacent to a second surface 132 of the heat sink. Although a pin-shape structured medium offers many advantages, it is difficult to fabricate with current technology. A HAMR media, composed of self-ordered magnetic particles with a uniform heat sink as shown in FIG. 5a, offers advantages over continuous media. Such a media can be fabricated using self-ordered iron-platinum particles, for example. FIG. 5b illustrates an oblique view of the sample medium 120.

Figure 6A:
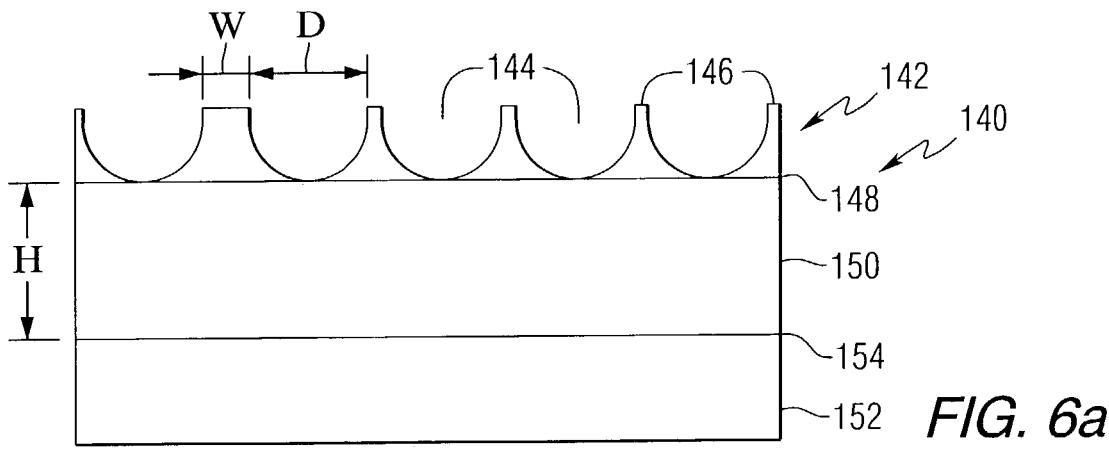
FIG. 6a is a side view of a portion of a complementary patterned recording medium constructed in accordance with this invention.
Figure 6B:
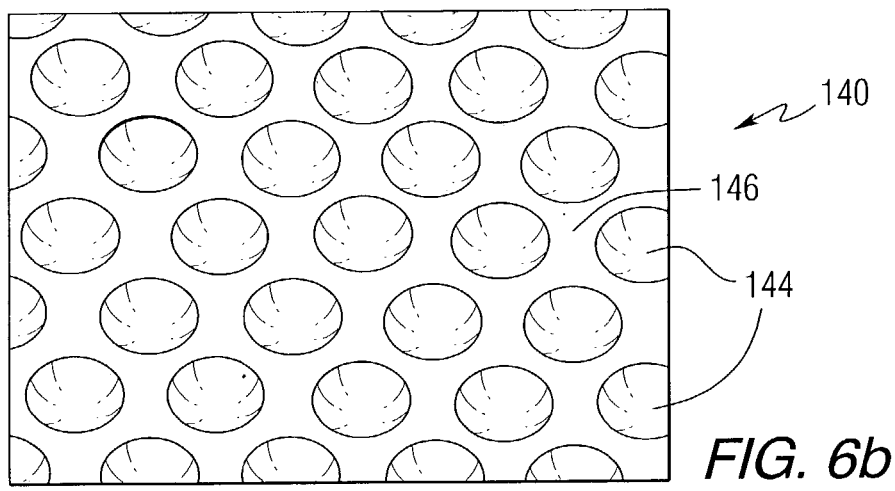
Figure 6C:
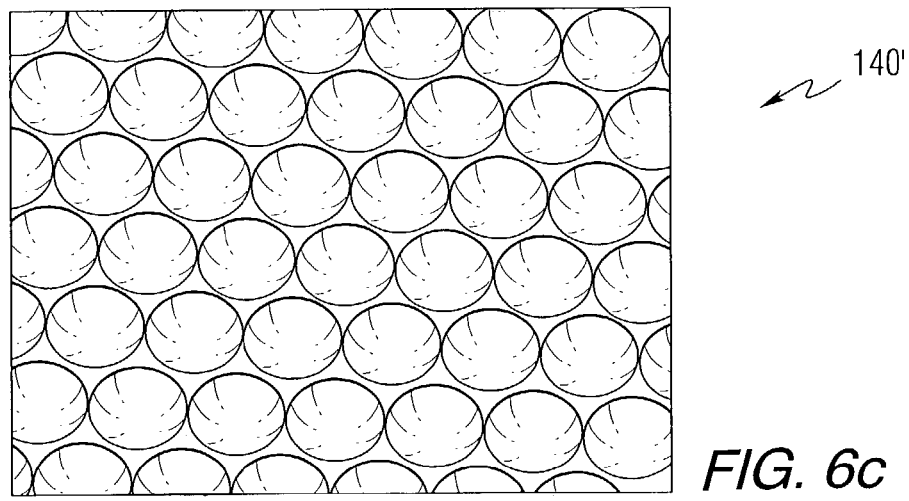

Complementary forms of the aforementioned media are also possible candidates. FIG. 6a is a side view of a portion of a complementary patterned recording medium 140 constructed in accordance with this invention. FIG. 6b is an oblique view of a portion of the patterned recording medium 140 of FIG. 6a. This structure includes a magnetic recording layer 142 including a plurality of depressions 144 and ridges 146. The magnetic recording layer is positioned adjacent to a first surface 148 of an electrically and thermally conductive heat sink 150. A substrate 152 is positioned adjacent to a second surface 154 of the heat sink. FIG. 6c is an oblique view of a similar medium 140' with the depressions being more closely spaced.

These complementary structures also provide optical and thermal advantages. Complementary patterned medium can be obtained by pressing, squeezing, and removing the aforementioned structures from a continuous medium. One additional advantage of the complementary patterned medium is that it may allow us to obtain structures similar to those of FIG. 6a by using the structure of FIG. 6b. The structures in FIG. 6a offer a higher enhancement in terms of energy coupling into the media. However the structures given in FIG. 6b may be easier to produce.

Figure 7:
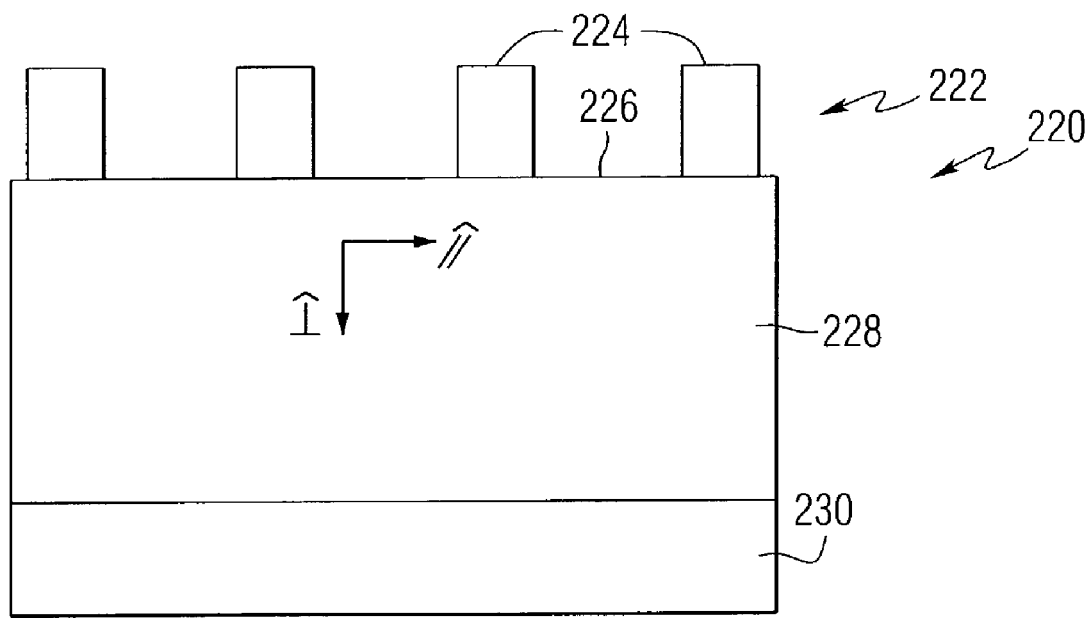
FIG. 7 is a side view of a portion of a patterned recording medium constructed in accordance with this invention.

Another possible way to prevent the spread of the thermal spot is to utilize anisotropic material as the heat-sink underlayer. FIG. 7 is a side view of a portion of a patterned recording medium 220 constructed in accordance with this invention. Medium 220 includes a magnetic recording layer 222 having a plurality of isolated magnetic recording elements 224 positioned adjacent to a surface 226 of an anisotropic heat sink 228. The heat sink is positioned adjacent to a substrate 230. Anisotropic films are often obtained naturally during thin film deposition processes. The films tend to grow in a columnar manner which gives rise to higher thermal conductivity along the columns than between columns. The materials that might be used for the anisotropic heat sink would include the usual suspects, gold, silver, copper, aluminum, etc.

Consider a material with thermal conductivity $K=K_\perp \hat{\perp} + K_\parallel \hat{\parallel}$, where $\hat{\perp}$ and $\hat{\parallel}$ directions are illustrated in FIG. 7, with the $\hat{\perp}$ direction being perpendicular to the plane of the medium and the $\hat{\parallel}$ direction being parallel to the plane of the medium. For example, the patterned HAMR medium 220 of FIG. 7 includes an anisotropic heat sink 228 with thermal conductivity K of: $K=K_\perp \hat{\perp} + K_\parallel \hat{\parallel}$.

Having a large $K_\parallel$ component helps the thermal wave spread in the lateral direction, which is undesired in a HAMR system. A large $K_\perp$ however, is very desirable for removing the heat from the magnetic layer. To prevent thermal spread, the vertical component of the thermal conductivity $K_\perp$ should be larger than the parallel component $K_\parallel$.

Figure 8:
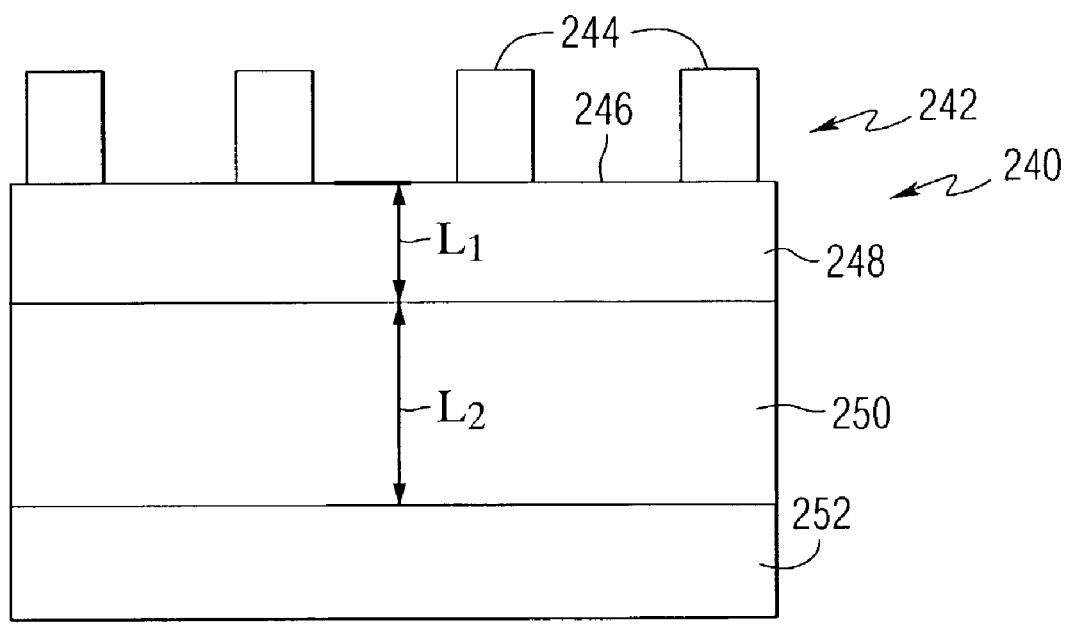
FIG. 8 is a side view of a portion of a patterned recording medium constructed in accordance with this invention.

Another possible way of removing heat from the patterned HAMR medium is to use multiple heat-sink layers as illustrated in FIG. 8. FIG. 8 is a side view of a portion of a patterned recording medium 240 constructed in accordance with this invention. Medium 240 includes a magnetic recording layer 242 having a plurality of isolated magnetic recording elements 244 positioned adjacent to a surface 246 of an anisotropic heat sink layer 248. A second, isotropic heat sink layer 250 is positioned between the anisotropic layer and a substrate 252.

FIG. 8 illustrates a patterned HAMR medium with double heat-sink layers. The anisotropic layer removes the heat from the magnetic media in the vertical direction, and prevents the spread of heat in a lateral direction. The isotropic layer removes heat quickly in all directions. In the structure of FIG. 8, the anisotropic heat sink layer 248 has a thermal conductivity of:

$$K=K_\perp \hat{\perp} + K_\parallel \hat{\parallel},$$

where $K_\perp > K_\parallel$. This layer removes the heat from the magnetic media in the vertical direction, and prevents the spread of heat in a lateral direction. As soon as the heat is removed from the magnetic layer, an aggressive heat sink layer 250, with high thermal conductivity in all directions can be used to quickly remove the heat from the anisotropic layer. Therefore, the second heat sink layer with isotropic thermal properties is placed under the anisotropic layer for quick removal of the heat.

The magnetic stability of a magnetized particle is given by the ratio $K_u V/k_B T$, where V is the volume of the particle, $K_u$ is the anisotropy, T is the temperature of the particle, and $k_B$ is Boltzmann's constant. To increase the magnetic stability of the media, the height H of the particles can be increased. This will increase the volume of the isolated magnetic recording elements, resulting in a more stable medium. The selection of this height is limited by tribological constraints. Alternatively, the width W of the patterns can be increased, or the separation distance D can be decreased. Although increasing the sparsity S can also increase the magnetic stability of the media, it significantly reduces the transmission efficiencies. Therefore, adjustment of the parameters H and S will increase the magnetic stability. However, the final adjustment will be subject to tribological constraints and the desired transmission efficiencies.

To achieve higher transmission efficiencies to the media patterns near an optical transducer, the sparsity S of the media and the width W of the patterns should be reduced and the height H of the patterns should be increased. This will make the media volumes more isolated and the electric field will better couple to the media due to the increase in the tangential component. Also, the volumes become more thermally isolated, which will increase the temperatures. However, as previously mentioned, inappropriate selection of these parameters may result in a magnetically unstable medium. Therefore, these parameters should be optimized considering the magnetic stability and the optical transducer performance.

To achieve higher temperatures in the magnetic medium requires higher transmission efficiencies. Selecting the heat-sink layer as a good electric conductor permits higher transmission efficiencies. However, a good conductor will remove heat very quickly from the magnetic layer resulting in lower temperatures. Therefore, this trade-off between the electrical conductivity and thermal conductivity should be adjusted based on the temperature requirements. The thickness of the heat sink layer is another factor that affects the temperature increase of the magnetic layer.

The data rates in a HAMR system are determined by how fast the previously heated magnetic volume cools down. To achieve higher data rates, the magnetic volume should be heated and cooled faster. The heat-sink layer determines how fast the magnetic volume cools down. Therefore, selecting a material with high thermal conductivity or increasing the heat sink thickness L will permit higher data rates. As previously mentioned, increasing the thermal conductivity or the thickness L will result in lower temperatures in the magnetic media. Therefore, this trade off should be adjusted based on the system requirements.

The isolated media pattern volumes can be formed in a variety of shapes. For example, granular particles of random shapes could be used. Other possible media pattern shapes include rectangular prism, cylinder, sphere, hexahedral, pentahedral, and tetrahedral. However, the invention is not limited to any particular shape of the magnetic recording elements. The shape and performance of the optical transducer, the interaction between the media volumes and optical transducer, the interaction and distance between the media volumes, the composition of the medium and the underlayer, the data rate, the temperature increase, and spot size requirements are the factors to be considered in determining the shape of these media volumes.

Figure 9A:
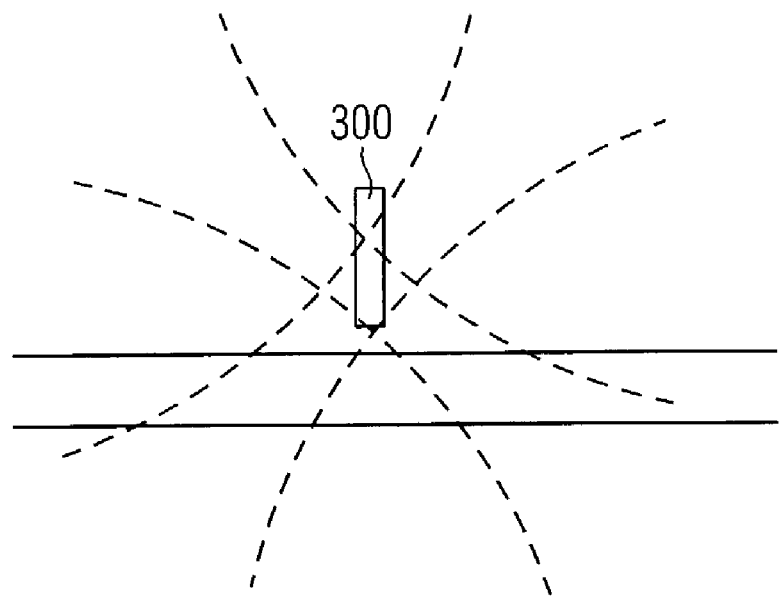
FIG. 9a is a schematic representation of a metallic pin adjacent to a continuous recording medium.
Figure 9B:
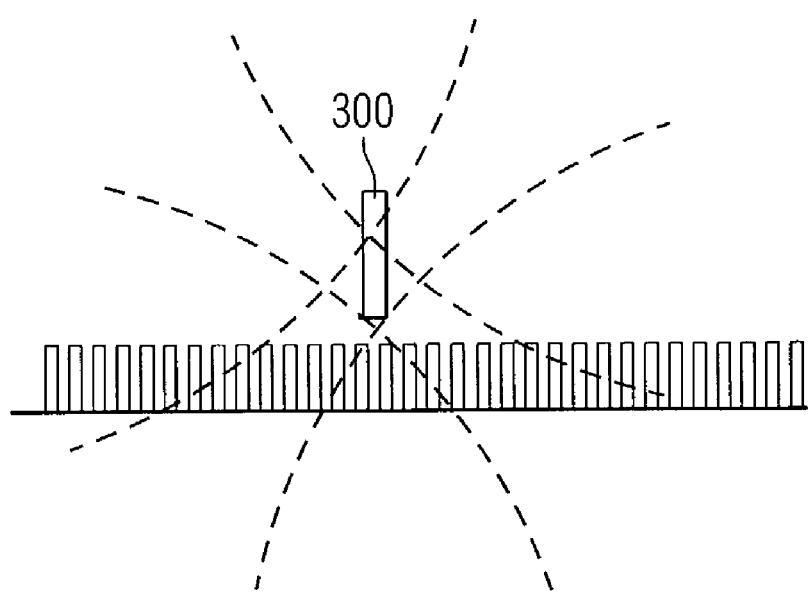
FIG. 9b is a schematic representation of a metallic pin adjacent to a patterned recording medium constructed in accordance with this invention.
Figure 10A:
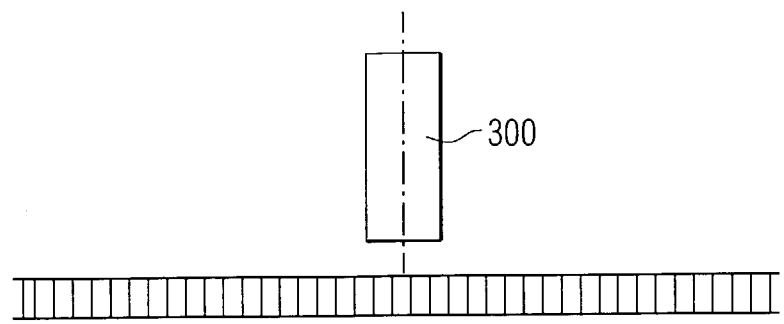
FIG. 10a is a schematic side view of a metallic pin adjacent to a patterned recording medium constructed in accordance with this invention.
Figure 10B:
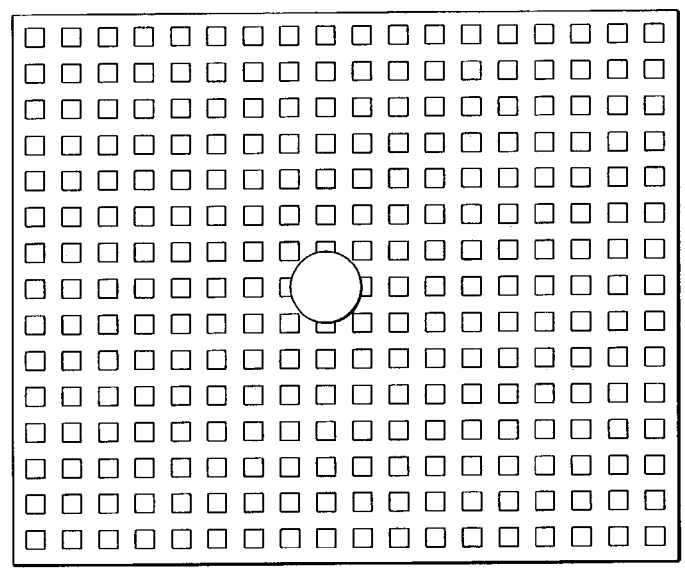
FIG. 10b is a schematic plan view of a metallic pin adjacent to a patterned recording medium constructed in accordance with this invention.
Figure 10C:
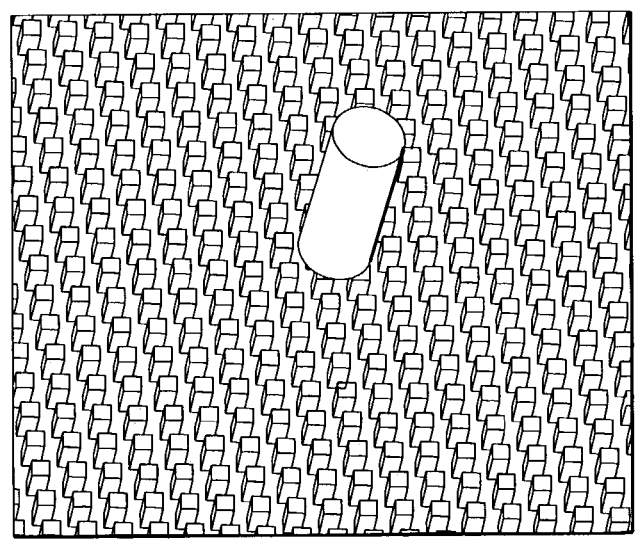
FIGS. 10c and 10d are pictorial representations of a metallic pin adjacent to a patterned recording medium constructed in accordance with this invention.
Figure 10D:
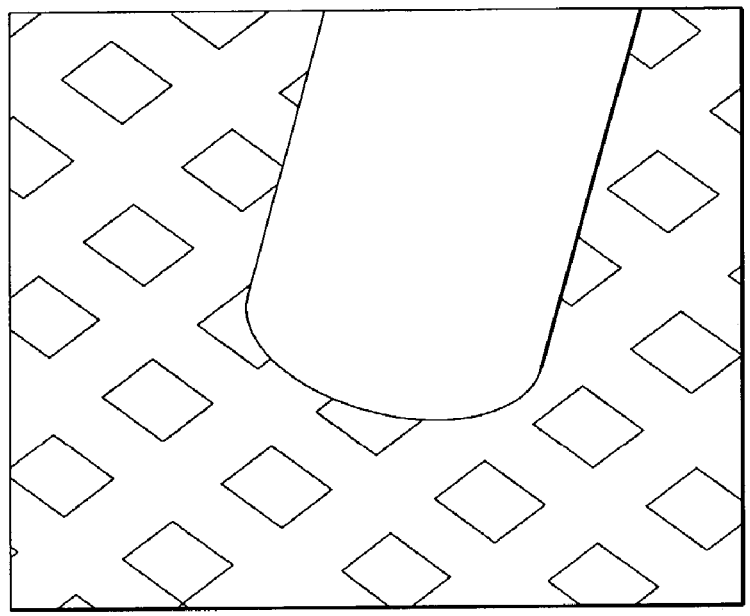

To illustrate the efficiency of the invention, optical and thermal calculations have been made using a finite element method (FEM-based) 3-D electromagnetic and thermal modeling software. The geometry used for the modeling is presented in FIGS. 9a through 10d. FIG. 9a is a schematic representation of a metallic pin excited using radial polarization in the presence of an electrically and thermally continuous medium. FIG. 9b is a schematic representation of a metallic pin in the presence of a patterned media which is excited using two incident focused light beams with a 180° relative phase shift so that the net electric field amplitude in the overlap region is primarily directed along the axis of the pin. FIG. 10a is a schematic representation of a side view of a gold pin and a patterned medium and a transducer. FIG. 10b is a schematic representation of a top view of a gold pin and a patterned medium and a transducer. FIGS. 10c and 10d are schematic representations of oblique views of a gold pin and a patterned medium and a transducer.

The gold pin 300 has a diameter of 20 nm and a height of 50 nm. The medium recording layer is comprised of 5 nm×5 nm×10 nm rectangular prisms separated by a distance of 5 nm. The calculations suggest a drastic improvement in terms of absorbed power densities. Furthermore, the optical FWHM is reduced as expected.

Figure 11A:
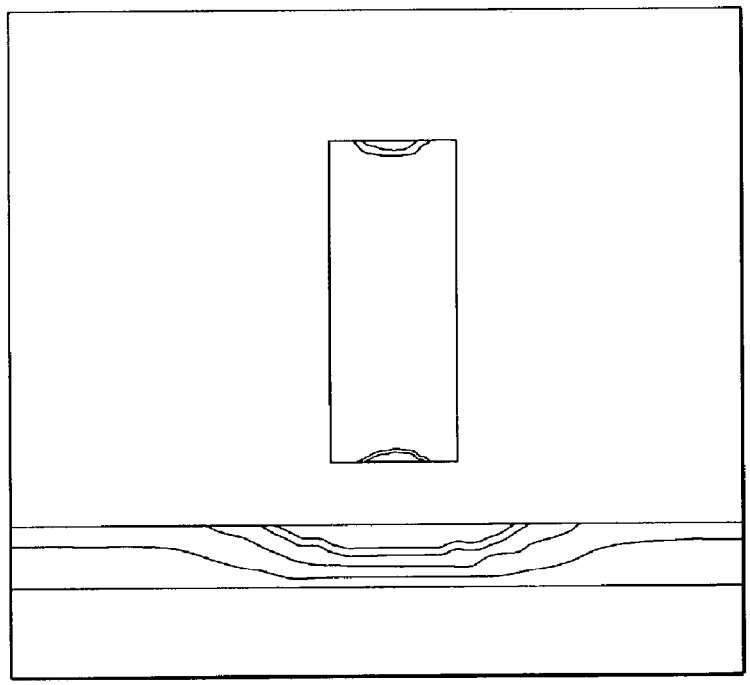
FIG. 11a is a schematic representation of absorbed optical densities for traditional media.
Figure 11B:
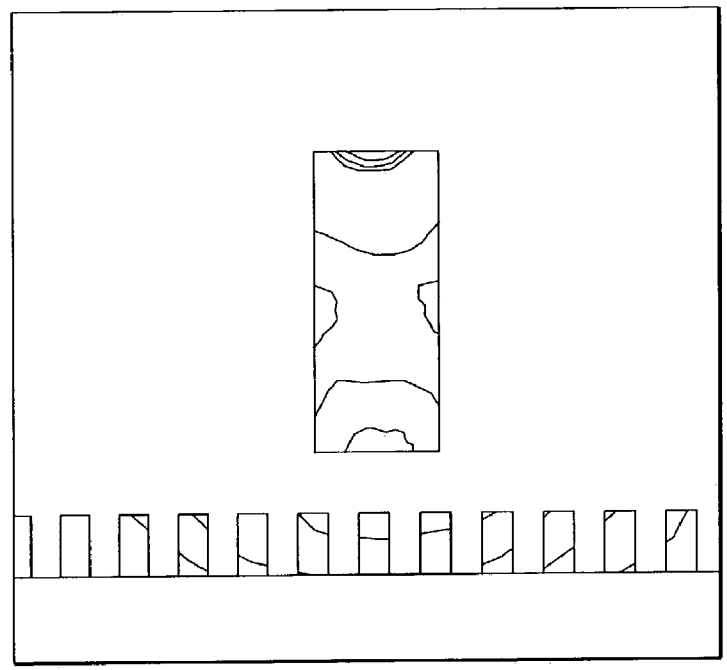
FIG. 11b is a schematic representation of absorbed optical densities for patterned media constructed in accordance with this invention.

The media configuration given in FIG. 9b was used to illustrate the advantages of patterned media from a thermal point of view. To compute the thermal profiles, the optical power profiles discussed above were used. FIGS. 11(a) and 11(b) illustrate the temperature profiles of the traditional and patterned media, respectively. Patterned media offers higher temperatures and smaller spot sizes compared to traditional media.

Figure 12A:
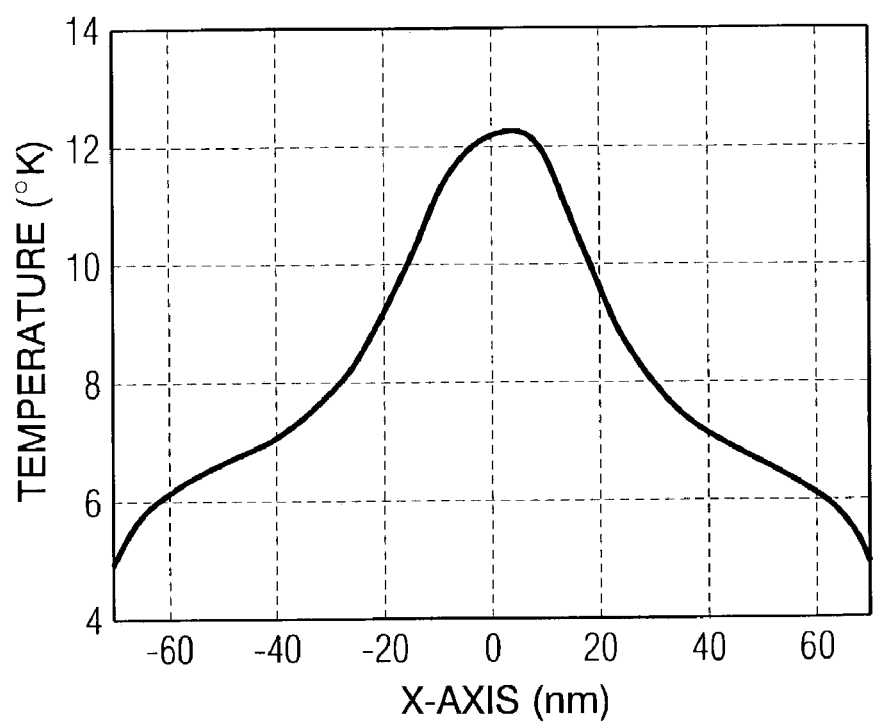
FIG. 12a is a graph of temperature distribution for traditional media.
Figure 12B:
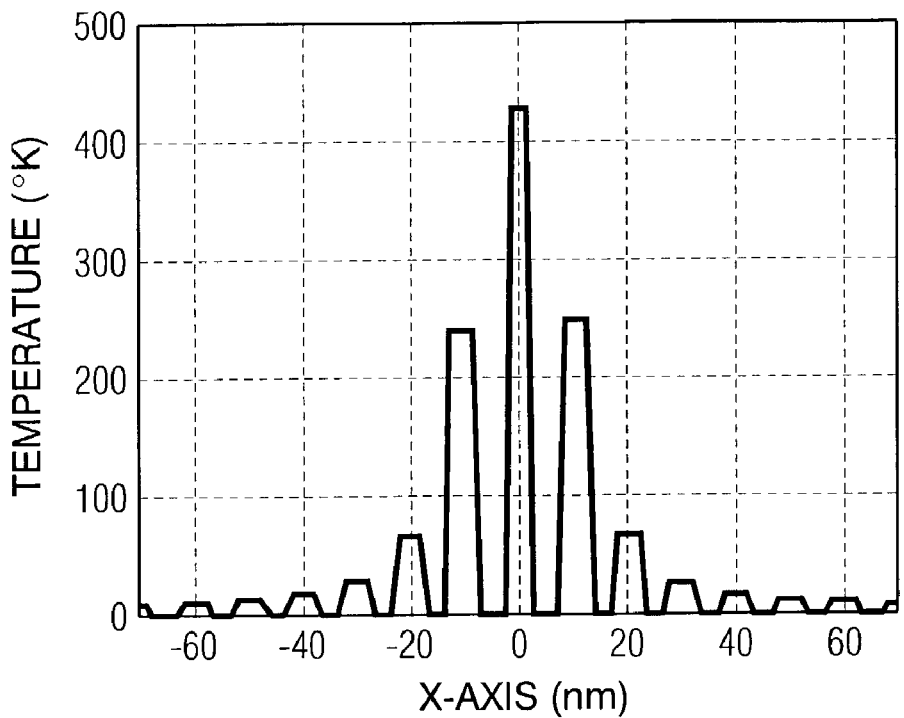
FIG. 12b is a graph of temperature distribution for patterned media constructed in accordance with this invention.
Figure 13:
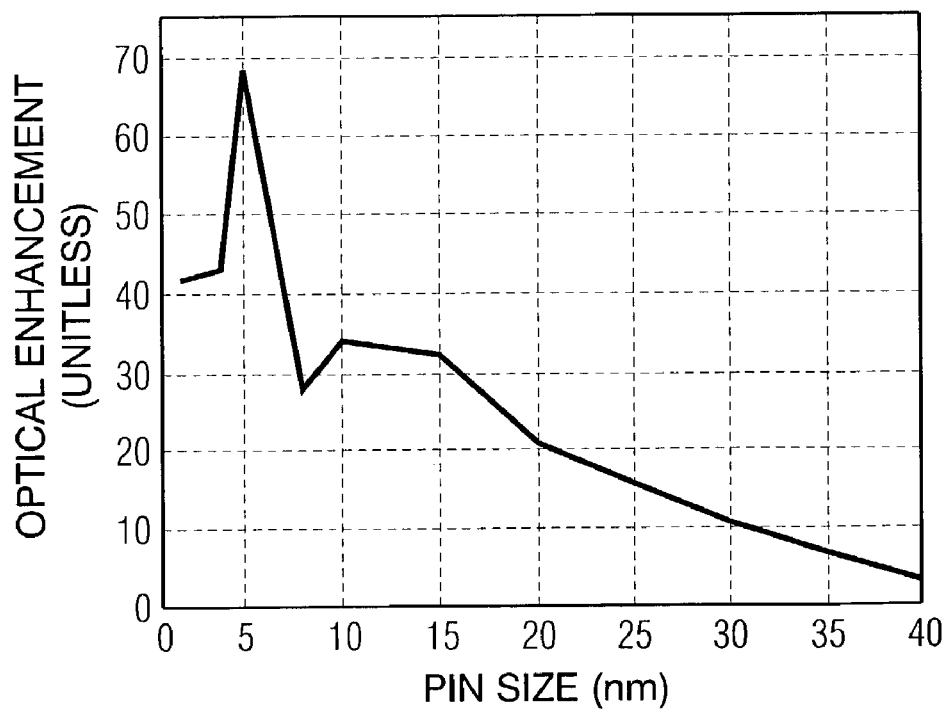
FIG. 13 is a graph of optical enhancement as a function of metallic pin size.

FIG. 12a is a graph of the temperature distribution for traditional continuous media. FIG. 12b is a graph of the temperature distribution for the patterned medium of this invention for the same incident light power. FIG. 13 is a graph of the optical enhancement as a function of the pin diameter.

An important parameter in the media design is the size of the magnetic particles. The optimum size depends on many factors including transducer geometry and composition, heat-sink underlayer geometry and composition, tribological constraints, magnetic stability, and data transfer rate. However, optimizing the magnetic particle diameter for a particular case may provide useful information. Therefore, the particle diameter for the simulations previously presented in FIGS. 9a through 10d was optimized. The diameter of the gold metallic pin is 20 nm.

A comparison of the absorbed optical power per unit volume provides a fair comparison of the results, since this quantity is the input to the thermal model. The optical enhancement can be expressed as the quantity:

$$OpticalEnhancement = \frac{\frac{\int_{V_{pm}} \sigma |E(r)|^2 \, dV}{V_{pm}}}{\frac{\int_{V_{tm}} \sigma |E(r)|^2}{V_{tm}} dV}$$

where $V_{pm}$ and $V_{tm}$ represent the volumes of patterned and traditional media in the 35 nm×35 nm×10 nm volume beneath the origin. FIG. 12 illustrates the optical enhancement as a function of magnetic particle diameter. Note that as the particle diameter increases, the patterned medium becomes more similar to the continuous medium, and the optical enhancement asymptotically reduces to unity, as expected. The simulation suggests an optimum value of 5 nm. The optimum value was calculated for a media with S=0.5 and media heights of 10 nm. In addition, a 20 nm diameter pin was used as the near field transducer. However, it should be noted that this optimum media particle width of 5 nm may deviate if these parameters are changed, and/or if the operational wavelength is changed.

As previously discussed, patterned media might not require as aggressive a heat sink as would be required in the continuous traditional media, since the thermal spread is prevented and similar thermal FWHMs are expected. A less aggressive heat sink layer means higher temperature increases. Also, another variation on the heat sink mechanism is the non-uniform heat sink underlayer as previously discussed.

Figure 14A:
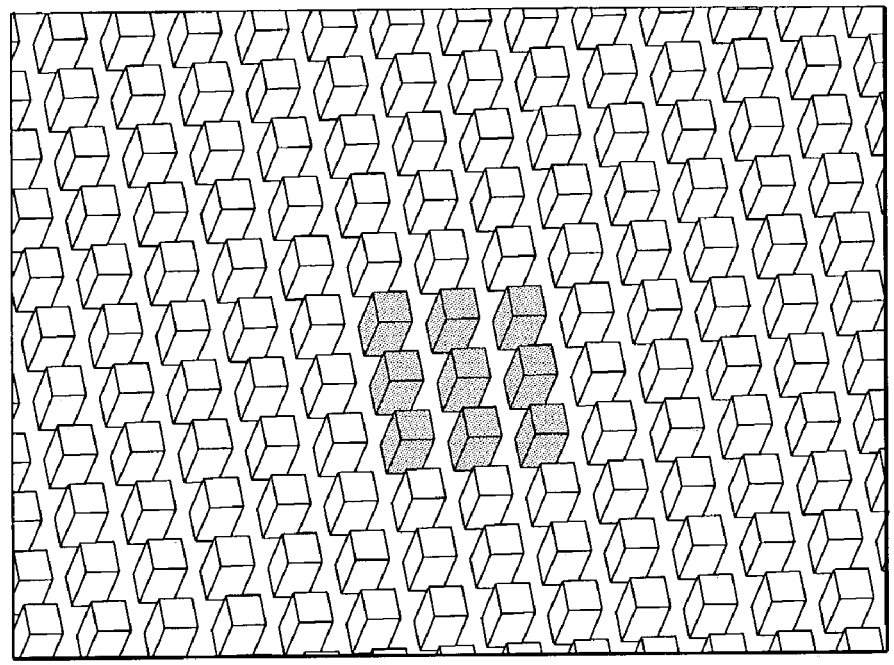
FIG. 14a is a pictorial representation illustrating the power density profile of an oblique view of patterned media constructed in accordance with this invention.
Figure 14B:
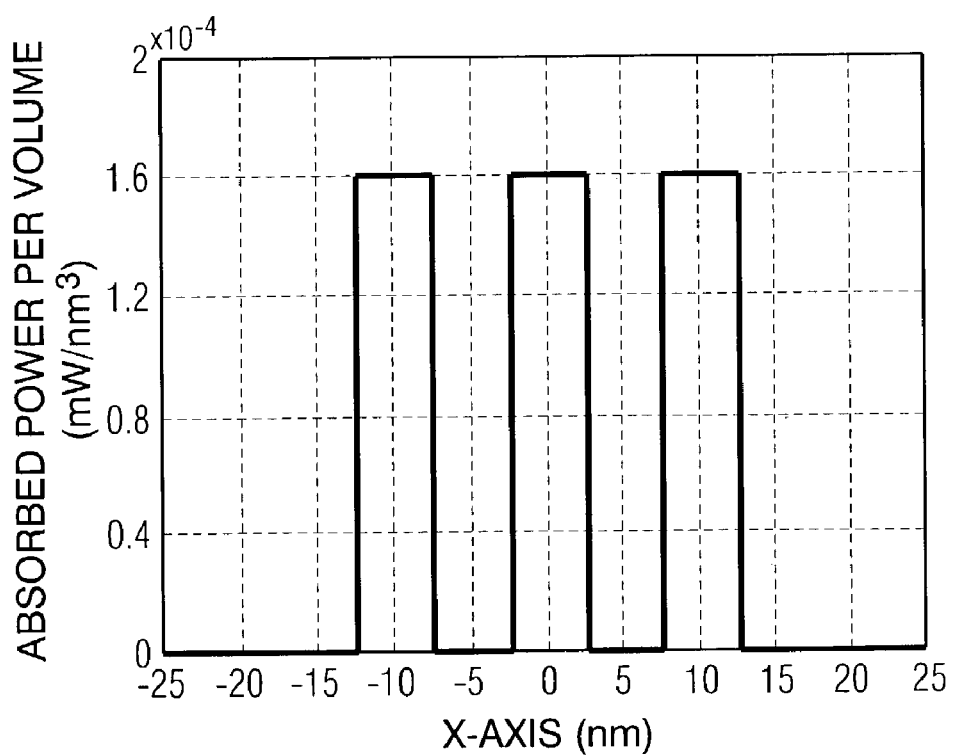
FIG. 14b is a graph of the absorbed power per unit volume of a patterned medium constructed in accordance with this invention.

To investigate the possible utilization of a less aggressive heat sink layer, the heat generation profile given in FIGS. 14a and 14b were assumed. Gold and nichrome heat sink underlayers are compared. Gold is a much better thermal conductor, therefore, it will prevent the lateral spread of the temperature profile. However, lower temperatures can be expected as a result of its high thermal conductivity. The temperature profiles for gold and nichrome underlayers are shown in FIGS. 15(a-c) and 16(a-c), respectively.

Figure 15A:
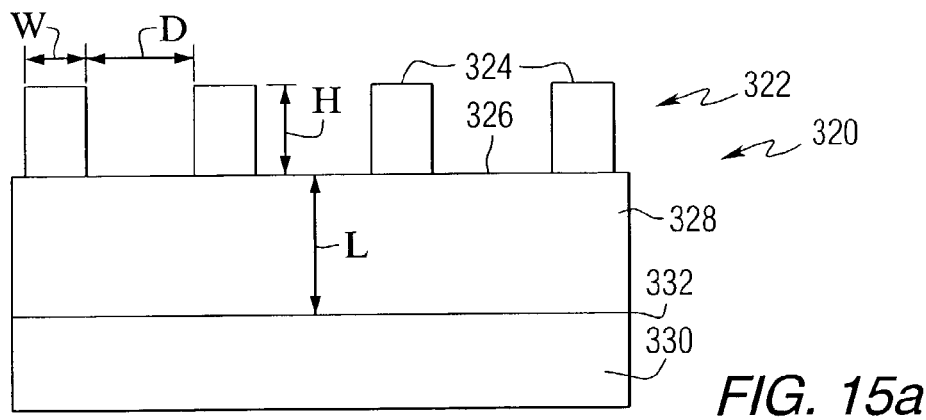
FIG. 15a is a side elevation view of a patterned media constructed in accordance with this invention with a gold underlayer.

FIG. 15a is a side view of a portion of a patterned recording medium 320 constructed in accordance with this invention. Patterned medium 320 includes a magnetic recording layer 322 having a plurality of isolated magnetic recording elements 324 positioned adjacent to a first surface 326 of a gold heat sink layer 328. An $SiO_2$ substrate 330 is positioned adjacent to a second surface 332 of the heat sink.

Figure 15B:
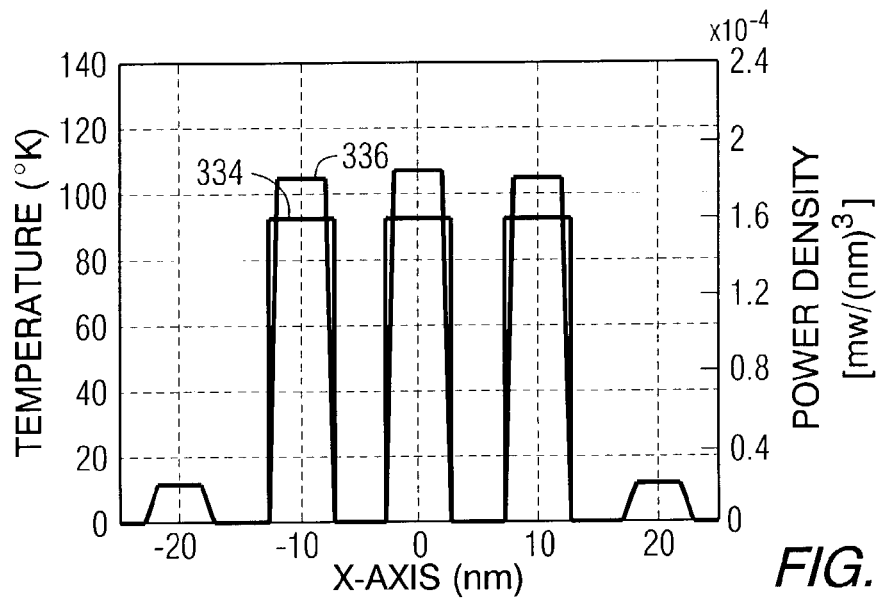
Figure 15C:
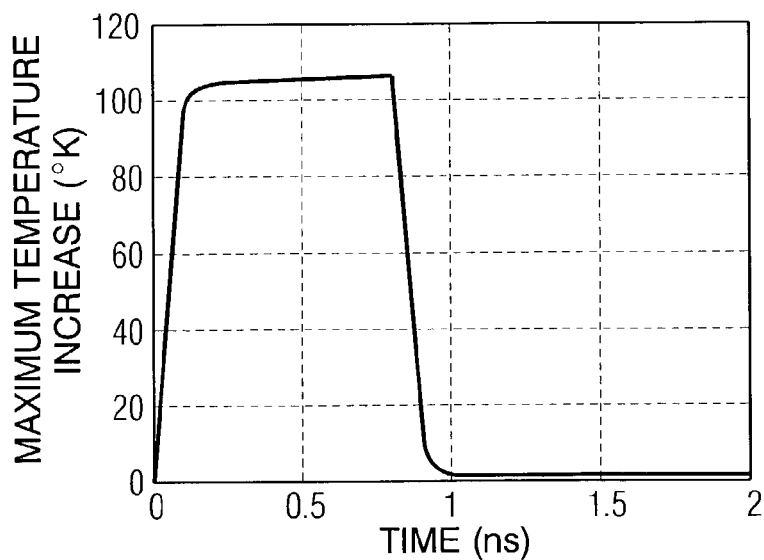

FIG. 15b is a graph of temperature versus distance for the patterned media of FIG. 15a. In FIG. 15b, curve 334 illustrates the temperature, while curve 336 illustrates the power density. FIG. 18c is a graph of temperature versus time for the patterned media of FIG. 15a.

Figure 16A:
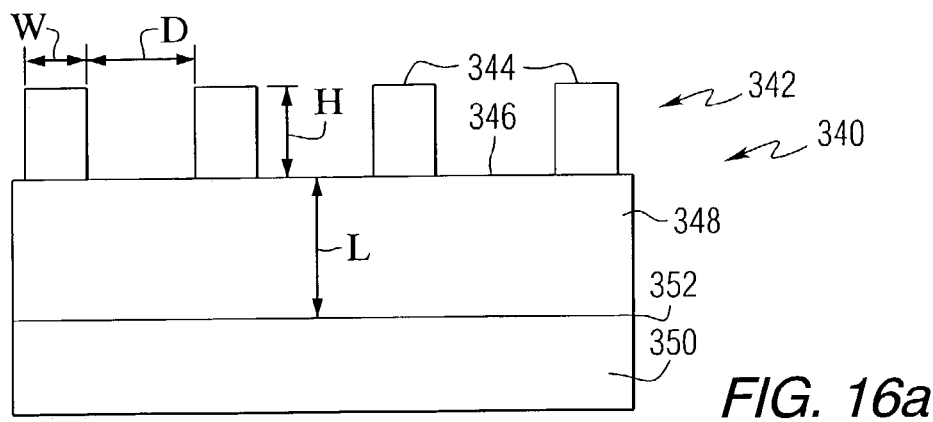
FIG. 16a is a side elevation view of a patterned media constructed in accordance with this invention with a nichrome underlayer.

FIG. 16a is a side view of a portion of a patterned recording medium 340 constructed in accordance with this invention. Patterned medium 340 includes a magnetic recording layer 342 having a plurality of isolated magnetic recording elements 344 positioned adjacent to a first surface 346 of a nichrome heat sink layer 348. An $SiO_2$ substrate 350 is positioned adjacent to a second surface 352 of the heat sink.

Figure 16B:
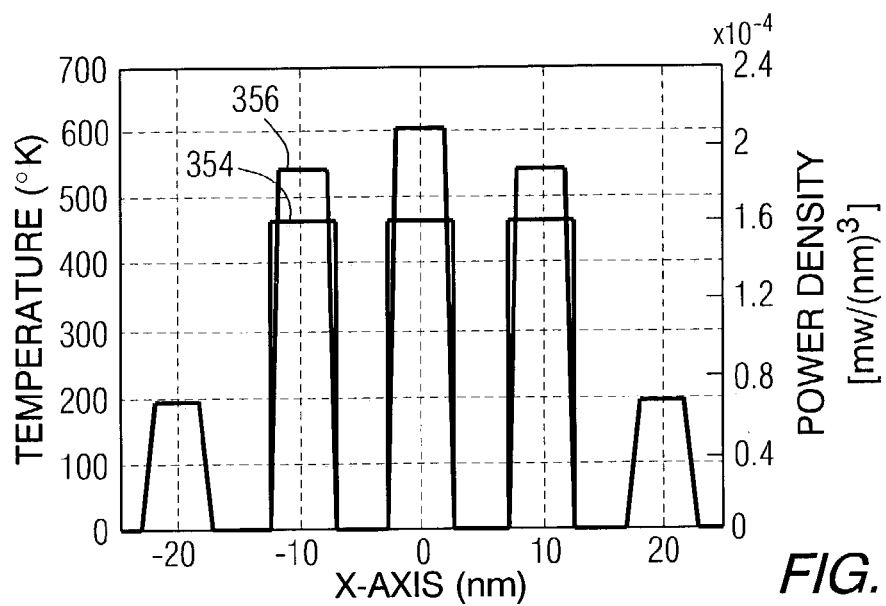
Figure 16C:
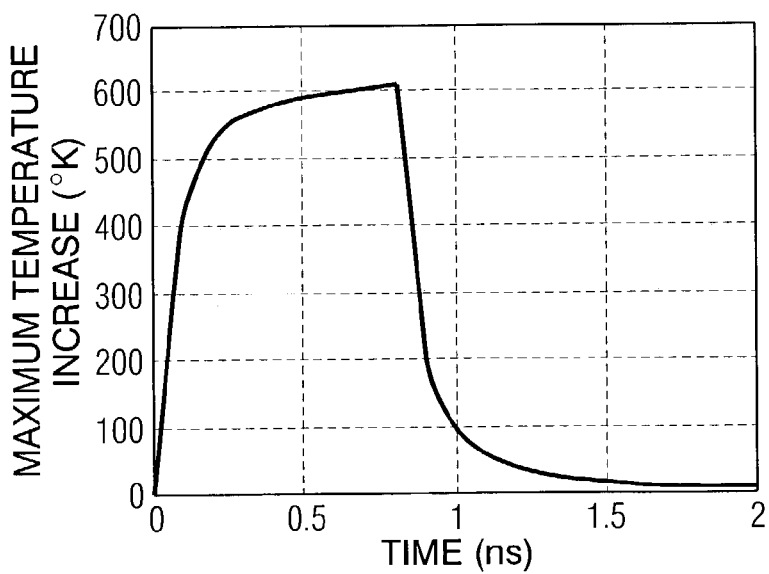

FIG. 16b is a graph of temperature versus distance for the patterned media of FIG. 16a. In FIG. 16b, curve 354 illustrates the temperature, while curve 356 illustrates the power density. FIG. 16c is a graph of temperature versus time for the patterned media of FIG. 16a.

The results suggest that the nichrome underlayer provides higher temperatures compared to the gold underlayer. Although side lobes are higher for the nichrome underlayer, they are still low enough to give the same FWHM. Also, the heating and cooling durations are longer for the nichrome underlayer. However, they are still short enough to provide the quick heating and cooling.

Figure 17A:
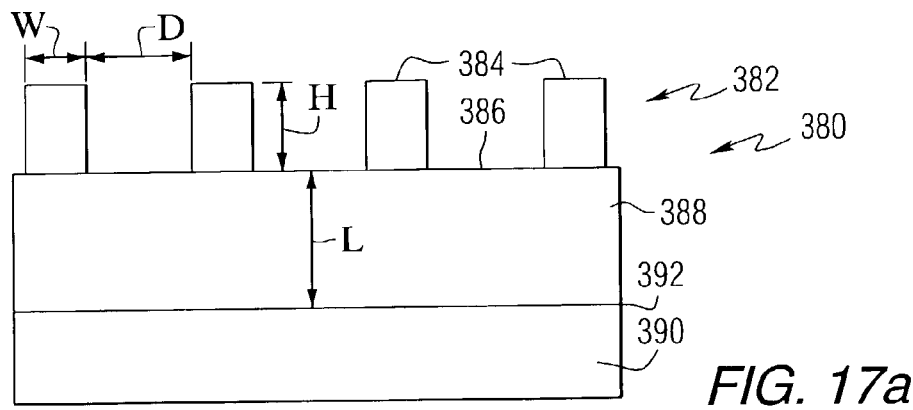
FIG. 17a is a side elevation view of a patterned media constructed in accordance with this invention with an anisotropic underlayer.

FIG. 17a is a side view of a portion of a patterned recording medium 380 constructed in accordance with this invention. Patterned medium 380 includes a magnetic recording layer 382 having a plurality of isolated magnetic recording elements 384 positioned adjacent to a first surface 386 of an anisotropic heat sink layer 388. A substrate 390 is positioned adjacent to a second surface 392 of the heat sink.

Figure 17B:
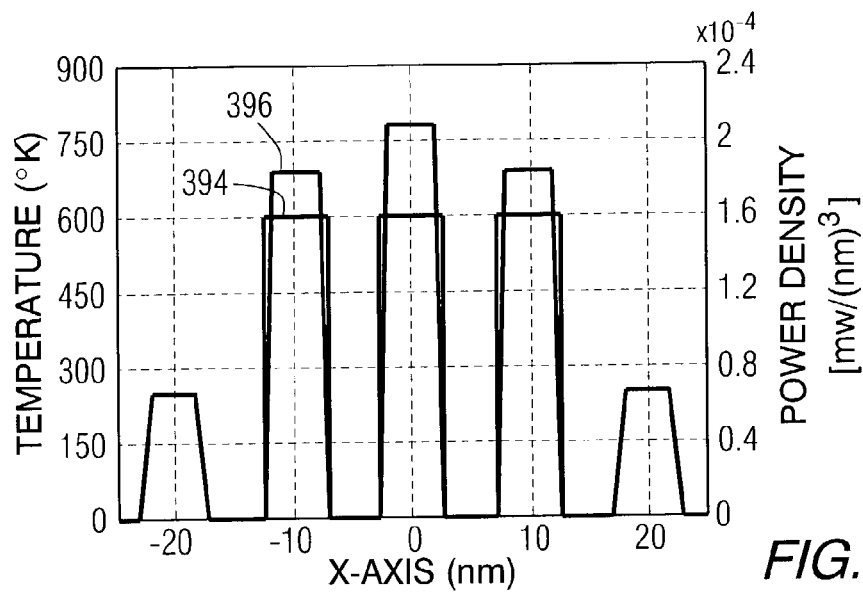
Figure 17C:
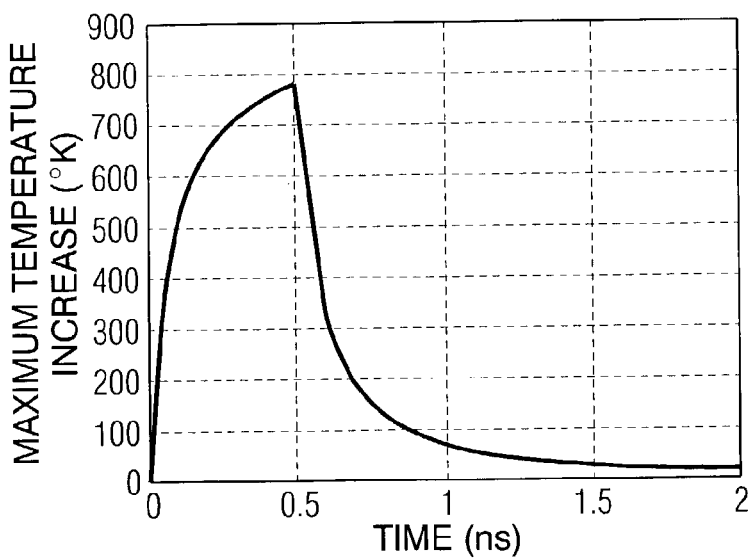

FIG. 17b is a graph of temperature versus distance for the patterned media of FIG. 17a. In FIG. 17b, curve 394 illustrates the temperature, while curve 396 illustrates the power density. FIG. 17c is a graph of temperature versus time for the patterned media of FIG. 17a.

Figure 18A:
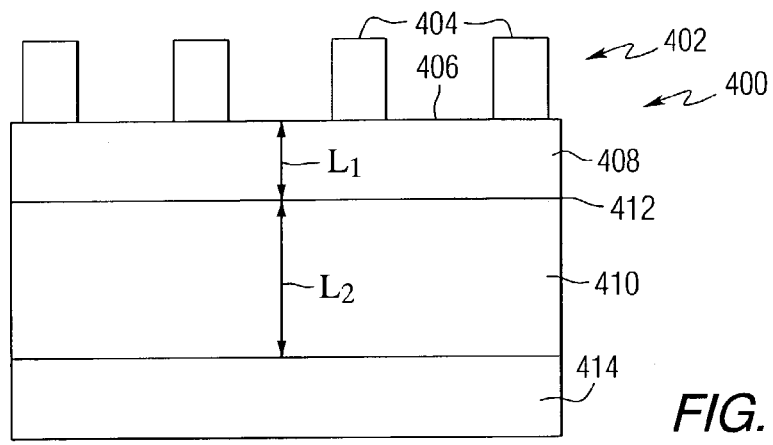
FIG. 18a is a side elevation view of a patterned media constructed in accordance with this invention with a multilayer heat sink.

FIG. 18a is a side view of a portion of a patterned recording medium 400 constructed in accordance with this invention. Patterned medium 400 includes a magnetic recording layer 402 having a plurality of isolated magnetic recording elements 404 positioned adjacent to a first surface 406 of an anisotropic heat sink layer 408. A gold heat sink layer 410 is positioned adjacent to a second surface 412 of the anisotropic heat sink layer 408. An $SiO_2$ substrate 414 is positioned adjacent to the gold heat sink layer.

Figure 18B:
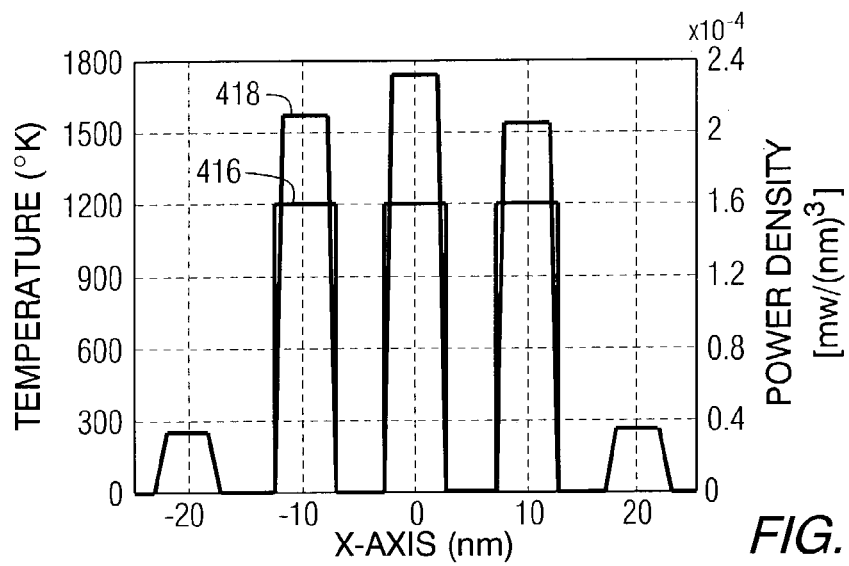
Figure 18C:
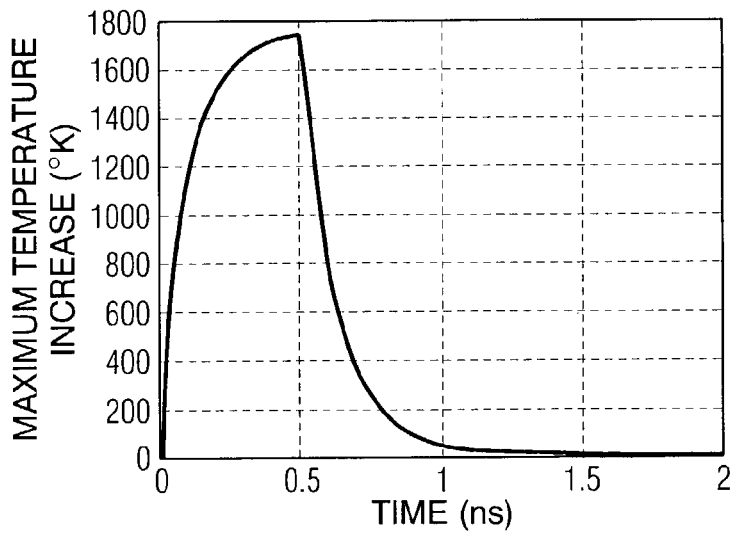

FIG. 18b is a graph of temperature versus distance for the patterned media of FIG. 18a. In FIG. 18b, curve 416 illustrates the temperature, while curve 418 illustrates the power density. FIG. 18c is a graph of temperature versus time for the patterned media of FIG. 18a.

While the described examples show the use of a metal pin as a means for delivering an electric field to the recording medium, it should be understood that any other device for producing electromagnetic radiation having an electric field component substantially perpendicular to the surface of the heat sink can be used in combination with the patterned media of this invention.

In the various described patterned media examples, the isolated magnetic recording elements can be, for example, CoPtCr, or FePt. The heat sink can be, for example, Ag, Ag, Cu, or Al. The substrate can be, for example, Al, Glass, or plastic. The dielectric layer can be, for example, $SiO_2$, ZnS, or $Al_2O_3$.

The bulk electrical conductivities of several materials that can be used in the media of this invention are: Ag $6.82 \times 10^7$ $(\Omega m)^{-1}$, Au $4.88 \times 10^7$ $(\Omega m)^{-1}$, Cu $6.48 \times 10^7$ $(\Omega m)^{-1}$, Al $4.14 \times 10^7$ $(\Omega m)^{-1}$, Fe $1.17 \times 10^7$ $(\Omega m)^{-1}$, Pt $1.04 \times 10^7$ $(\Omega m)^{-1}$, Co $1.79 \times 10^7$ $(\Omega m)^{-1}$. The bulk thermal conductivities are: Ag 4.29 W/(cm K), Au 3.19 W/(cm K), Cu 4.03 W/(cm K), Al 2.36 W/(cm K), Fe 0.865 W/(cm K), Pt 0.717 W/(cm K), Co 1.05 W/(cm K). However, for thin films the parallel and perpendicular conductivities may deviate from these values. This may assist in producing heat sink layers with anisotropic conductivities.

Figure 19:
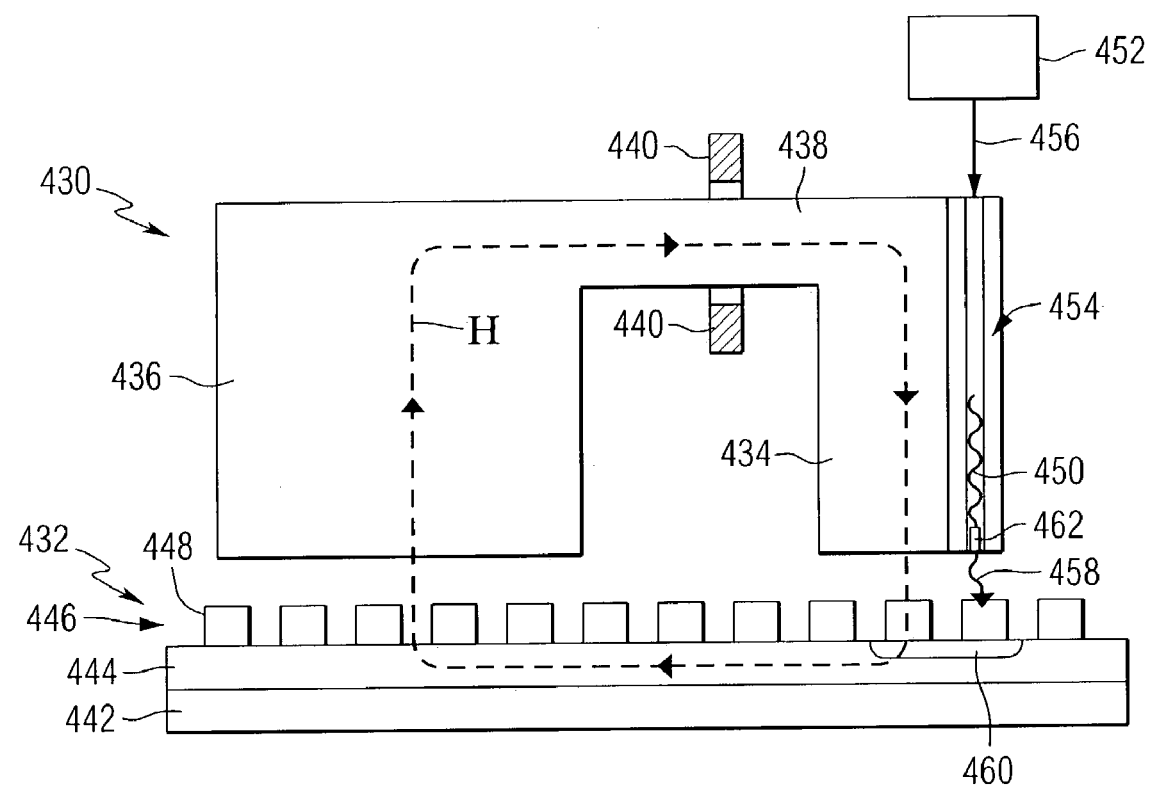
FIG. 19 is a pictorial representation of a heat assisted magnetic recording head that can be used in combination with the recording media of this invention.

FIG. 19 is a partially schematic side view of a heat assisted magnetic recording head 430 and a magnetic recording medium 432 constructed in accordance with this invention. Although an embodiment of the invention is described herein with reference to recording head 430 as a perpendicular magnetic recording head and the medium 432 as a perpendicular magnetic recording medium, it will be appreciated that aspects of the invention may also be used in conjunction with other types of recording heads where it may be desirable to employ heat assisted recording. Specifically, the recording head 430 may include a writer section comprising a main write pole 434 and a return or opposing pole 436 that are magnetically coupled by a yoke or pedestal 438. It will be appreciated that the recording head 430 may be constructed with a write pole 434 only and no return pole 436 or yoke 438. A magnetization coil 440 surrounds the yoke or pedestal 438 for energizing the recording head 430. The recording head 430 also may include a read head, not shown, which may be any conventional type read head as is generally known in the art.

Still referring to FIG. 19, the recording medium 432 is positioned adjacent to or under the recording head 430. The recording medium 432 includes a substrate 442, which may be made of any suitable material such as ceramic glass or amorphous glass. An electrically conductive and thermally conductive heat sink layer 444 is deposited on the substrate 442. The heat sink layer 444 may be made of any suitable material such as, for example, alloys or multilayers including gold, copper, silver or aluminum. A magnetic recording layer 446 having a plurality of isolated magnetic recording elements 448 is deposited on the heat sink layer 444, with the perpendicular oriented magnetic domains 450 contained in the magnetic recording elements 448. Suitable magnetic materials for the magnetic recording layer 446 may include at least one material selected from, for example, FePt or CoCrPt alloys having a relatively high anisotropy at ambient temperature.

The recording head 430 also includes means for providing an electromagnetic wave 450 in the form of a light source 452 and a planar waveguide structure 454 to heat the magnetic recording medium 432 proximate to where the write pole 434 applies the magnetic write field H to the recording medium 432. The optical waveguide 454 acts in association with a light source 452 which transmits light, for example via an optical fiber 456 that is in optical communication with the optical waveguide 454. The light source 452 may be, for example, a laser diode, or other suitable laser light sources. This provides for the generation of a guided mode that may propagate through the optical waveguide 454. Electromagnetic radiation, generally designated by reference number 458, is transmitted from the waveguide to heat the recording medium 432, and particularly for heating the isolated magnetic recording elements in the vicinity of a localized area 460 of the recording medium. A near field transducer in the form of a pin 462 is provided adjacent to an end of the optical waveguide. While the example of FIG. 19 shows a pin as a near field transducer, as discussed above, the media of this invention can be used in combination with other types of transducers, such as a ridge waveguide.

The operating frequency of the laser is another factor determining the efficiency of the final design. Therefore, the final design must be optimized as a function of frequency including the frequency-dependent material properties.

The media of this invention uses discrete magnetic recording elements that are thermally and electrically isolated from each other. Of course even with air or another thermally insulating material between the recording elements, there will be a very small thermal conduction. Depending on the inter-grain spacing, there could possibly also be a very small tunneling current. So the grains may not be completely electrically or thermally isolated. The use of discrete magnetic recording elements increases the light coupling and temperature response. Also a heat sink underlayer is used to reduce the coupling inefficiency due to fringing of the electric field lines. The heat sink layer is also effective in removing the heat quickly from the media.

In the above description, the word "adjacent" has been used to describe a relationship of the position of various elements with respect to each other. It should be understood that adjacent means both in contact with, or near to. In particular a thin layer of material, such as a buffer layer can be positioned between adjacent layers.

While the present invention has been described in terms of several examples, it will be apparent to those skilled in the art that various changes can be made to the disclosed examples without departing from the scope of the invention as defined by the following claims.

What is claimed is:

1. A data storage device comprising:
   an electrically conductive heat sink layer;
   a plurality of discrete magnetic recording elements positioned adjacent to a first surface of the heat sink layer; and
   a recording head further comprising:
   a near field transducer for producing electromagnetic radiation having an electric field component substantially perpendicular to the first surface of the heat sink; and
   a pole for changing the magnetization of the discrete magnetic recording elements.

2. The data storage device of claim 1, further comprising a substrate layer adjacent to a second surface of the first heat sink layer.

3. The data storage device of claim 1, further comprising a thermally insulating material positioned between the discrete magnetic recording elements.

4. The data storage device of claim 1, wherein the heat sink has an anisotropic thermal conductivity.

5. The data storage device of claim 1, wherein the discrete magnetic recording elements comprise self-ordered structures.

6. The data storage device of claim 1, wherein the discrete magnetic recording elements comprise a plurality of ridges.

7. A system comprising:
- a motor for rotating a recording medium;
- an arm for positioning a heat assisted magnetic recording head adjacent to a surface of the recording medium;
- wherein the recording medium comprises an electrically conductive heat sink layer, and a plurality of discrete magnetic recording elements positioned adjacent to a first surface of the heat sink layer;
- wherein the recording head includes:
  - a near field transducer for producing electromagnetic radiation having an electric field component substantially perpendicular to the first surface of the heat sink; and
  - a pole for changing the magnetization of the discrete magnetic recording elements.

8. The system of claim 7, wherein the near field transducer comprises one of a metallic pin and a ridge waveguide.

9. The system of claim 7, wherein the recording medium further comprises a substrate layer adjacent to a second surface of the first heat sink layer.

10. The system of claim 9, wherein magnetic dots comprise a material selected from the group consisting of CoCr, CoCrB, CoPtB, CoPtBO, FePt, FePeCu, FePeCuB, FePeC, and their oxidation and wherein shells comprises a material selected from the group consisting of chromium, paladium, NiMn, FeMn, PtMn, and NiO.

11. The data storage apparatus system of claim 9, further comprising:
- a non-magnetic material between magnetic dots.

12. The system of claim 7, wherein the recording medium further comprises a thermally insulating material positioned between the discrete magnetic recording elements.

13. The system of claim 7, wherein the heat sink layer has an anisotropic thermal conductivity.

14. The system of claim 7, wherein the discrete magnetic recording elements comprise self-ordered structures.

15. The system of claim 7, wherein the discrete magnetic recording elements comprise a plurality of ridges.

* * * * *